US011937145B2

(12) United States Patent
Jakobson et al.

(10) Patent No.: US 11,937,145 B2
(45) Date of Patent: *Mar. 19, 2024

(54) MASHING MAPPING CONTENT DISPLAYED ON MOBILE DEVICES

(71) Applicant: Empire IP LLC, New York, NY (US)

(72) Inventors: Gabriel Jakobson, Alamo, CA (US); Steven L. Rueben, Las Vegas, NV (US)

(73) Assignee: Nearby Systems LLC, Bernardsville, NJ (US)

( * ) Notice: Subject to any disclaimer, the term of this patent is extended or adjusted under 35 U.S.C. 154(b) by 371 days.

This patent is subject to a terminal disclaimer.

(21) Appl. No.: 16/570,298

(22) Filed: Sep. 13, 2019

(65) Prior Publication Data

US 2020/0015032 A1 Jan. 9, 2020

Related U.S. Application Data

(63) Continuation of application No. 15/346,599, filed on Nov. 8, 2016, now Pat. No. 10,469,980, which is a (Continued)

(51) Int. Cl.
*H04W 4/00* (2018.01)
*G06F 3/04847* (2022.01)
(Continued)

(52) U.S. Cl.
CPC .......... *H04W 4/02* (2013.01); *G06F 3/04847* (2013.01); *H04M 1/72457* (2021.01);
(Continued)

(58) Field of Classification Search
CPC ..... H04W 4/02; H04W 4/029; G06F 3/04847; G06F 3/0482; H04M 1/72572; G09B 29/007
See application file for complete search history.

(56) References Cited

U.S. PATENT DOCUMENTS

| 5,528,248 | A | * | 6/1996 | Steiner | ..................... | G01S 19/35 |
| | | | | | | 342/357.31 |
| 6,377,793 | B1 | * | 4/2002 | Jenkins | ................... | H04W 4/02 |
| | | | | | | 455/414.3 |

(Continued)

*Primary Examiner* — Cesar B Paula
*Assistant Examiner* — David Faber
(74) *Attorney, Agent, or Firm* — Kasha Law LLC; John R. Kasha; Kelly L. Kasha

(57) ABSTRACT

A method and apparatus for mapping addressable information (e.g., locations denoted by name or address, street addresses, landmarks, etc.) off of disparate applications on a mobile device, onto an existing map on the mobile device, are disclosed. An application on a mobile device may display addressable information (e.g., a website displaying a location name and/or address, an email containing an address, etc.). In response to a user's selecting the addressable information and invoking a mapping command, a map-display application (e.g., Google Maps®, Yahoo! Maps®, Windows Live Search Map®, MapQuest®, iPhone® maps, Waze® etc.) may be automatically presented (e.g., launches, become visible, displayed, etc.) displaying the addressable information in addition to at least one prior mapping content previously displayed by the map-display application.

9 Claims, 22 Drawing Sheets

Related U.S. Application Data continuation of application No. 13/987,520, filed on Aug. 3, 2013, now Pat. No. 9,532,164, which is a continuation-in-part of application No. 11/974,258, filed on Oct. 12, 2007, now abandoned.

(51) Int. Cl.
  *H04M 1/72457* (2021.01)
  *H04W 4/02* (2018.01)
  *H04W 4/029* (2018.01)
  *G06F 3/0482* (2013.01)
  *G09B 29/00* (2006.01)

(52) U.S. Cl.
  CPC .......... *H04W 4/029* (2018.02); *G06F 3/0482* (2013.01); *G09B 29/007* (2013.01)

(56) References Cited

U.S. PATENT DOCUMENTS

| | | | | |
|---|---|---|---|---|
| 6,862,524 B1* | 3/2005 | Nagda | ............. | G08G 1/096816 340/995.13 |
| 7,409,405 B1* | 8/2008 | Masinter | ................. | G06F 9/445 707/999.102 |
| 7,440,842 B1* | 10/2008 | Vorona | ................. | G08G 1/0104 340/995.13 |
| 7,698,062 B1* | 4/2010 | McMullen | ....... | G08G 1/096844 701/438 |
| 7,729,947 B1* | 6/2010 | Philbin | ................. | G06Q 30/02 705/5 |
| 8,145,416 B2* | 3/2012 | Wailes | .................... | G06F 16/29 701/533 |
| 8,160,812 B1* | 4/2012 | Ng | ..................... | G01C 21/3682 701/425 |
| 8,649,968 B2* | 2/2014 | Cooper | ................... | H04W 4/02 701/409 |
| 8,693,995 B2* | 4/2014 | Fisher | ................ | G06Q 30/0239 455/418 |
| 2002/0181442 A1* | 12/2002 | Rajani | ....................... | H04L 9/40 370/352 |
| 2003/0036848 A1* | 2/2003 | Sheha | ..................... | H04W 4/02 340/990 |
| 2003/0229441 A1* | 12/2003 | Pechatnikov | ...... | G01C 21/3611 701/411 |
| 2005/0027705 A1* | 2/2005 | Sadri | ..................... | G06F 16/904 707/999.005 |
| 2005/0227709 A1* | 10/2005 | Chang | ................... | H04W 4/029 701/469 |
| 2006/0026170 A1* | 2/2006 | Kreitler | .................... | G06F 16/29 |
| 2006/0058953 A1* | 3/2006 | Cooper | ................... | H04W 4/021 701/532 |
| 2006/0136389 A1* | 6/2006 | Cover | ................. | G06F 9/44526 |
| 2006/0173615 A1* | 8/2006 | Pinkus | .................. | G06F 3/0482 340/995.14 |
| 2007/0129880 A1* | 6/2007 | Thacher | .................. | H04W 4/20 340/995.19 |
| 2007/0143297 A1* | 6/2007 | Recio | ................... | G06F 16/9537 |
| 2008/0119200 A1* | 5/2008 | McConnell | ............. | H04W 4/02 455/466 |
| 2008/0168398 A1* | 7/2008 | Geelen | ............... | G01C 21/3655 715/854 |
| 2008/0172173 A1* | 7/2008 | Chang | .................... | H04L 67/52 455/456.3 |
| 2008/0182598 A1* | 7/2008 | Bowman | ................ | G01C 21/26 455/466 |
| 2008/0301643 A1* | 12/2008 | Appleton | ............... | G06Q 30/02 717/124 |
| 2009/0012953 A1* | 1/2009 | Chu | ....................... | G06F 16/29 707/999.005 |

\* cited by examiner

MASHING MAPPING CONTENT DISPLAYED ON MOBILE DEVICES

RELATED U.S. APPLICATION DATA

This patent application is a continuation of U.S. patent application Ser. No. 15/346,599 filed Nov. 8, 2016, which is a continuation of U.S. patent application Ser. No. 13/987,520 filed Aug. 3, 2013, now U.S. Pat. No. 9,532,164, which is a continuation-in-part of U.S. patent application Ser. No. 11/974,258 filed on Oct. 12, 2007, the disclosures of which are incorporated herein by reference.

FIELD OF INVENTION

The present invention relates to mapping on electronic devices. More particularly, the present invention relates to relaying address information to a mapping application and/or mapping service for display on a common map.

BACKGROUND OF THE INVENTION

Popular mapping services include Google Maps®, Yahoo! Maps®, Windows Live Search Maps®, MapQuest®, Waze®, iOS®-based maps and others. Mapping services are typically available to a user through a web browser or a mapping application, running on a computer or a portable electronic device, such a smart phone, personal digital assistant, etc. Such mapping services allow a user to obtain a map corresponding to a given address or landmark. In the prior art, a digital map on an electronic device may display various content: for example, location names, addresses, user photos, comments, ratings, etc.

In the prior art, new mapping content may only be generated from within the mapping application. New mapping content origination outside of the mapping application, for example a location name selected in a separate application, may be automatically displayed on a new digital map, wherein the new digital map does not contain any other mappable information previously displayed.

SUMMARY OF THE INVENTION

The present invention provides a method for combining mappable data from disparate sources onto a single digital map in a mapping application on a hand-held electronic device. A digital map displayed in a mapping application (e.g., an iOS®-based or Android®-based smart phone) may include various mappable content. A second set of mappable content, found outside the mapping application, may be transmitted to the mapping application for mapping in conjunction with any of the existing (i.e. previously-displayed) mapping content.

DESCRIPTION OF THE DRAWINGS

For a more complete understanding of the present invention and further advantages thereof, references are now made to the following Detailed Description, taken in conjunction with the drawings, in which.

DETAILED DESCRIPTION

Figure 1A:
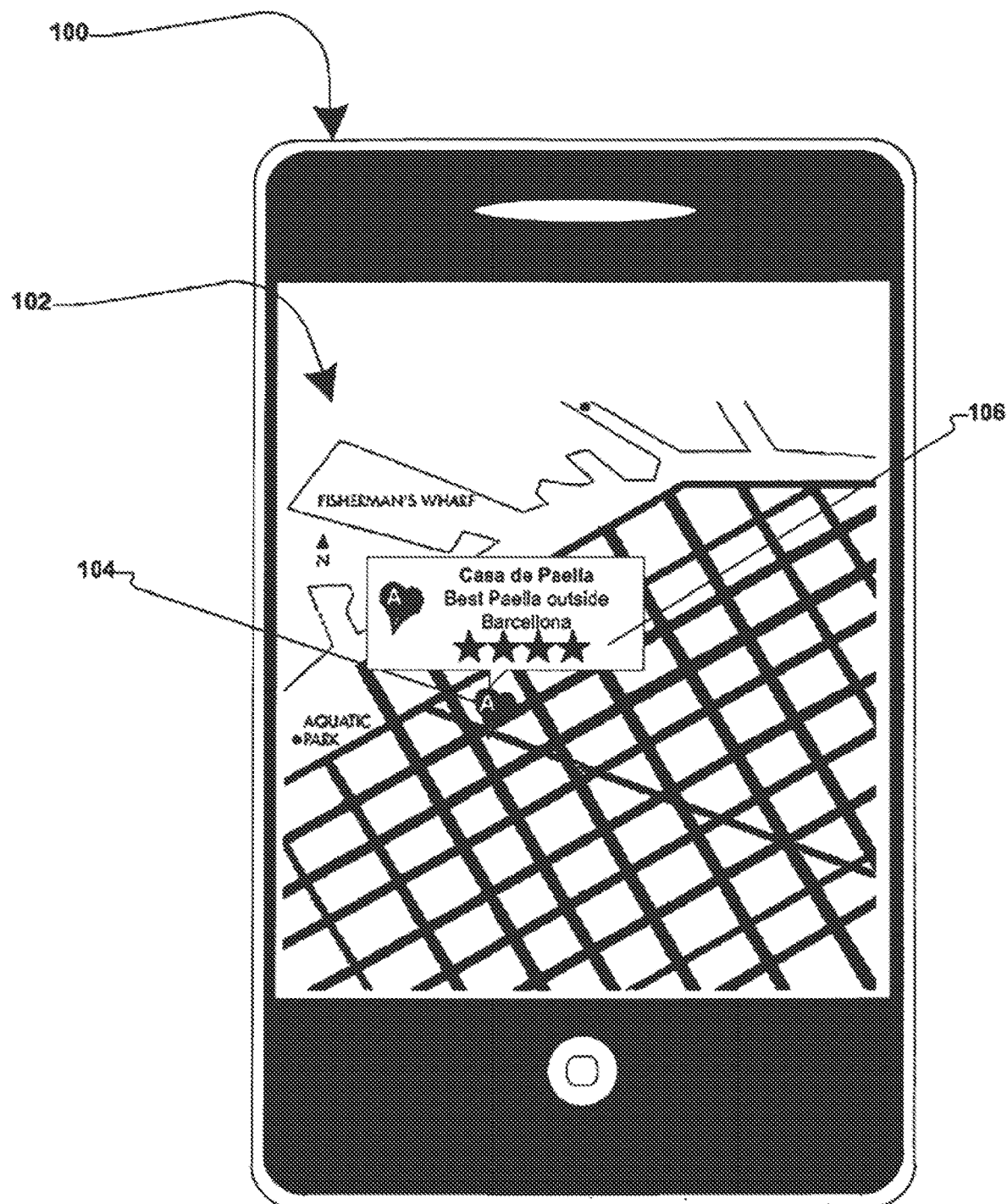
FIGS. 1A, 1B, and 1C are generalized block diagrams illustrating displaying content from various different sources onto a single map in a mapping application on a mobile device, according to various presently-preferred embodiments of the invention.
Figure 1B:
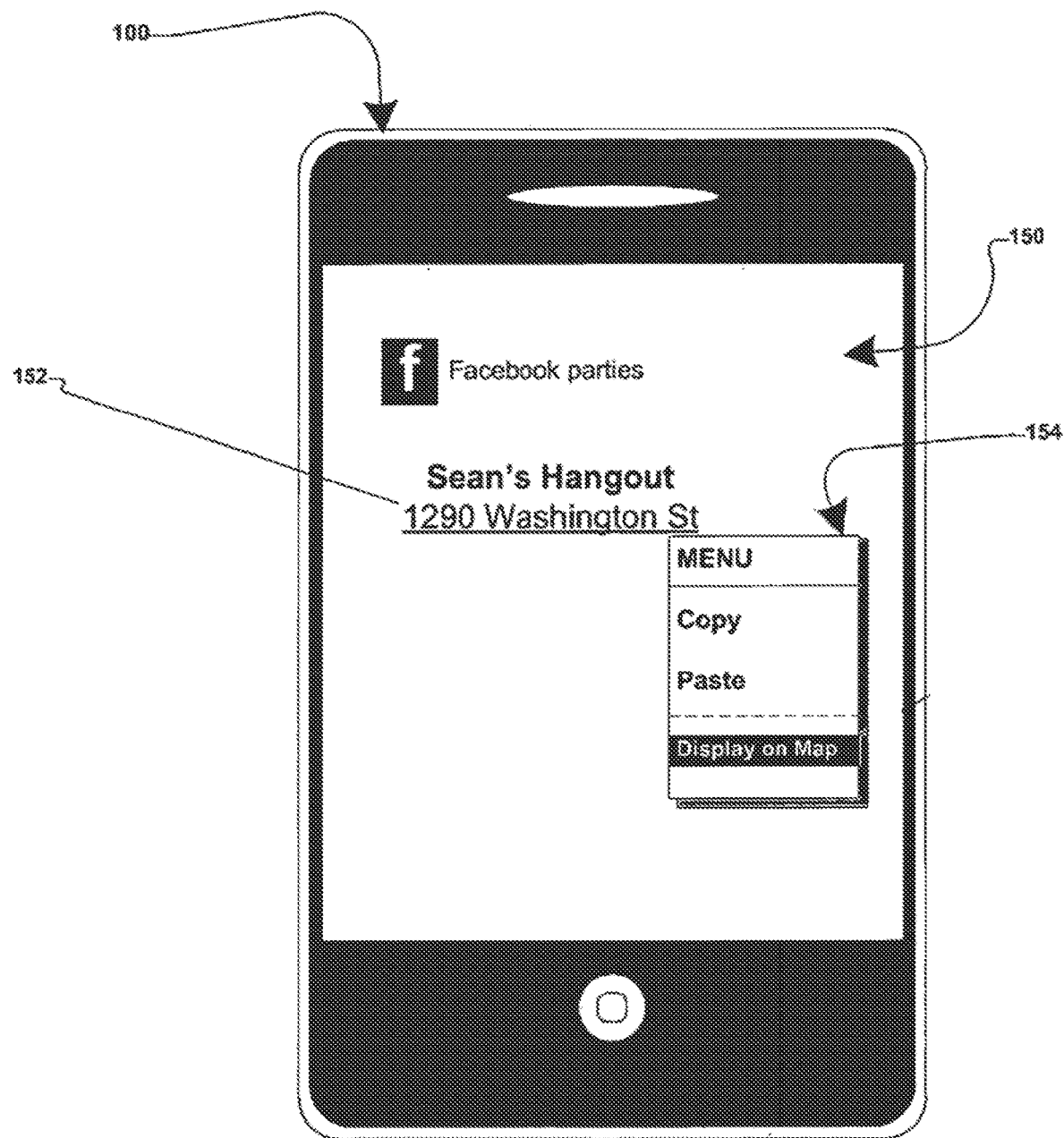
Figure 1C:
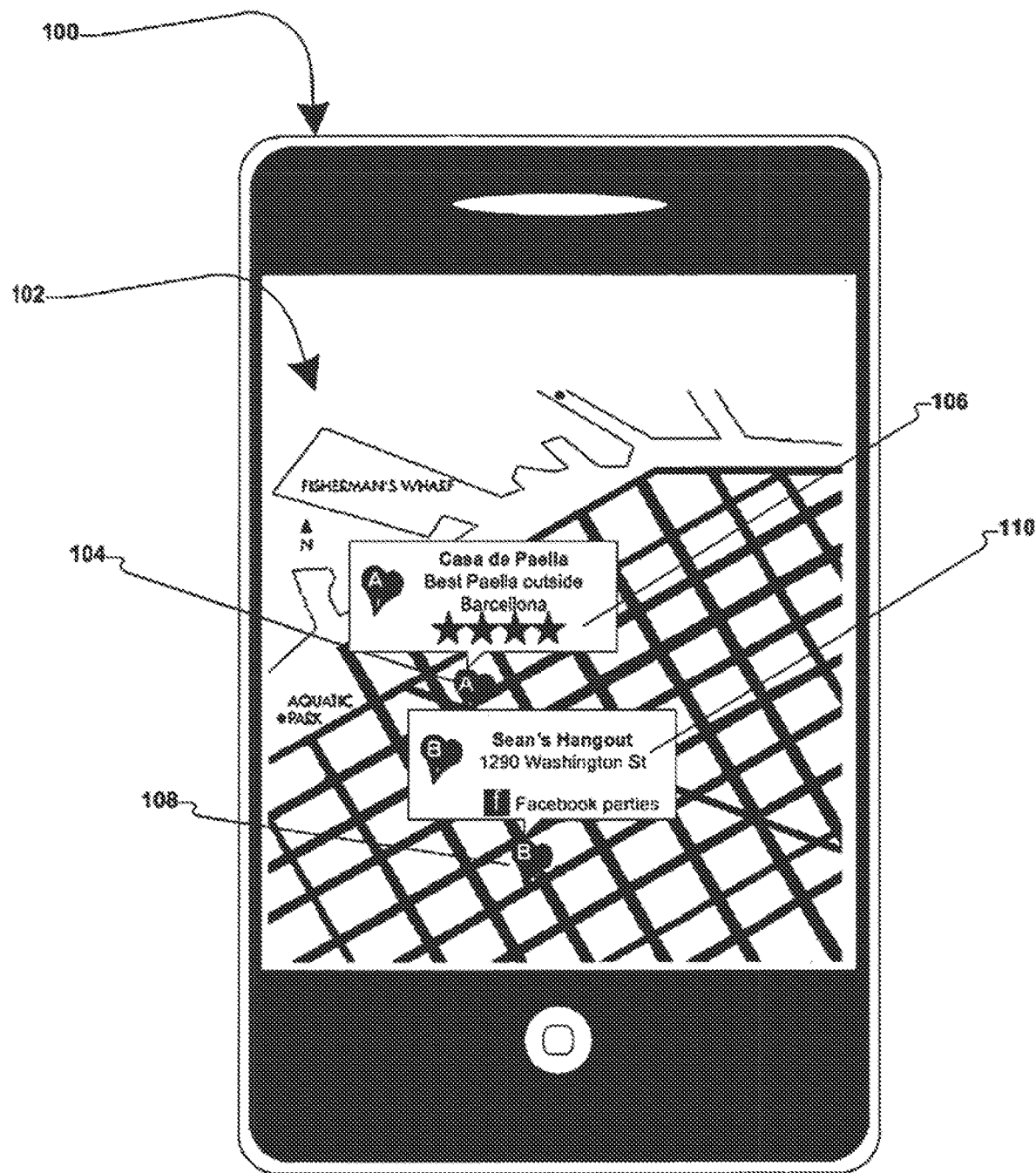

FIGS. 1A-1C are generalized block diagrams illustrating displaying content from various different sources onto a single map in a mapping application on a mobile device, according to various presently-preferred embodiments of the invention.

Referring to FIG. 1A, an electronic device (e.g., a mobile device 100 (e.g., iPhone®, iPad®, iTouch®, Android®-based smart phone, etc.) may display a digital map 102 in a mapping application (e.g., Google Maps®, Waze®, iOS®-based mapping applications, etc.) The digital map 102 may include a point-of-interest ("POI") indicator "A" 104—commonly displayed at its geo-location on the digital map 102. Additional text/picture content 106 may be displayed in conjunction with the POI 104 (e.g., containing advertising, user comments/ratings, or general information such as "Casa de Paella, Best Paella outside Barcelona" in this illustration.)

Referring now to FIG. 1B, the user of the electronic device may launch another application, e.g., Facebook 150. The other application 150 may contain generally-mappable information 152, such as street names (e.g., "1290 Washington St.", etc.) In the prior art, a user's selecting the generally-mappable information 152 may display a menu 154, allowing the user to select displaying the mappable information 152 on a digital map in a map-display application.

However, in the prior art, the mappable information 152 would display on a separate map not containing any previous mapping information.

Referring now to FIG. 1C, the same digital map 102 in the mapping application described in FIG. 1A may be displayed, with a new POI "B" 108 depicting the mappable information 152 (commonly at a geo-location indicated by the mappable information 152 in FIG. 1B) displayed in addition to the previous content (POI "A" 104 and POI content 106). In one possible embodiment, additional content 110 depicting the new POI "B" 108 may be displayed (e.g., with further information on the POI "B" 108 such as user ratings, reviews and other forms of media.)

In one possible embodiment, the generally-mappable information 152 may be passed into a search engine associated with the mapping application, and the search engine may produce a result set, some or all of which may be mapped (e.g., as POI "B" 108 and POI content 106). In a related presently-preferred embodiment, the mapping application may be closed/minimized/reduced to a background process by the OS of the mobile device, during the intermediary step of opening the other application (FIG. 1B) The mapping application may save its state (including any search queries, their results and any mapping data displayed) such that when it is restored into full view (FIG. 1C), any new mapping data would be displayed in conjunction with the original displayed mapping data.

Figure 2:
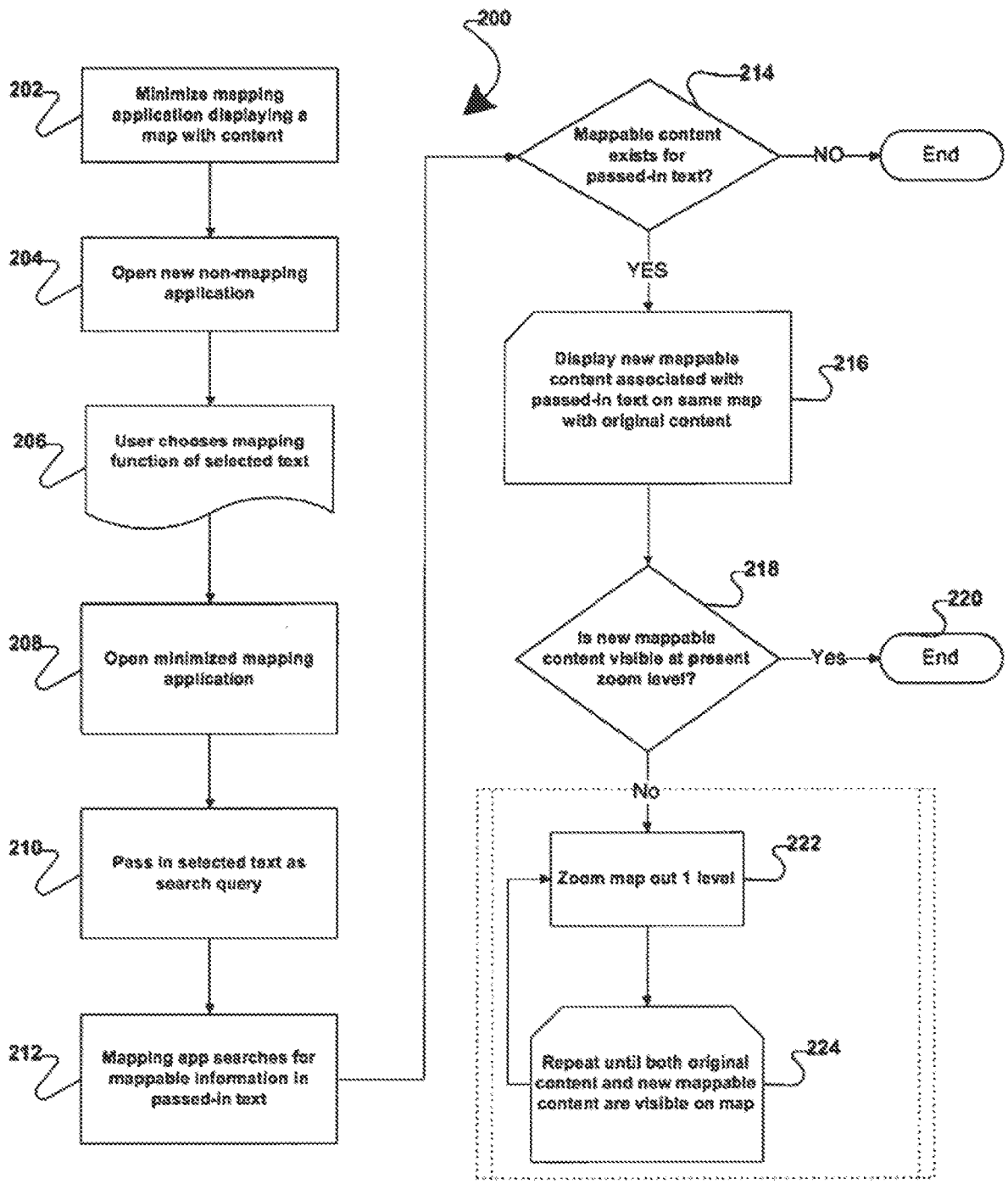
FIG. 2 is a generalized flow diagram illustrating an operation of a mapping application and a secondary application on a mobile device, displaying common POIs on a digital map, in one possible embodiment of the present invention.

FIG. 2 is a generalized flow diagram illustrating an operation of a mapping application and a secondary application on a mobile device, displaying common POIs on a digital map, in one possible embodiment of the present invention.

Flow diagram 200 assumes a mobile device having at least one application for displaying digital maps and at least one application for displaying mappable content (e.g., location names, street addresses) that is not the same as the application for displaying digital maps. At step 202, a mapping application, displayed at least some original mapping content (e.g., places on a map, business names, etc.) may be minimized, replaced at step 204 by a non-mapping application, from the user's perspective. (e.g., the user of the mobile device may launch the non-mapping application which may overtake the mapping application on the display of the device.) The non-mapping application may display at least some text or content that could be displayed on a map (e.g., address, location name, POI description, set of Long/Lat coordinates, etc.)

At step 206, the user may select the text or content (e.g., by highlighting it, clicking on it, etc.) and in response, a menu may become visible to the user, with an option to display on a map. Alternatively, if the text/content is hyperlinked, step 206 may be executed with a single click, without use of a menu.

At step 208, the mapping application may be re-opened (i.e. brought to the forefront of the display, becoming an active application, visible to the user.) At step 210, the selected text/content at step 206 may be passed in as a search query to the mapping application (e.g., if the selected text was "Peet's Coffee San Francisco", this text would be passed in and treated as a search query) causing the mapping application to conduct a query search, at step 212. (in the present example, all the "Peet's Coffee in San Francisco", returned with their corresponding geo-locations.)

At step 214, it may be determined whether the search query has produced a valid result set. If it its determined no valid mappable results exist (e.g., the user search for "The Kremlin" in San Francisco), this flow may be terminated. If it is determined at step 214 that at least some new mappable content exists, at step 216 the new mappable content may be displayed on the original map, along with the original content.

In one possible embodiment, zoom level of the map may be adjusted so that the new mappable content is visible to the user. At step 218 it may be determined whether the new mappable content is visible on the existing map at the current zoom level. In an affirmative case, this flow may end at step 220. Otherwise, steps 222 and 224, the map may be zoomed out until the new mappable content is visible to the user: at step 222, the zoom level may be incremented by one level until at step 224 it is determined the reached zoom level is such where both the new mappable content and the original content are visible to the user. In an alternate possible embodiment, steps 222-224 may be replaced by a computation of a new zoom level achieving the same result, and the new zoom level may be automatically implemented.

Figure 3A:
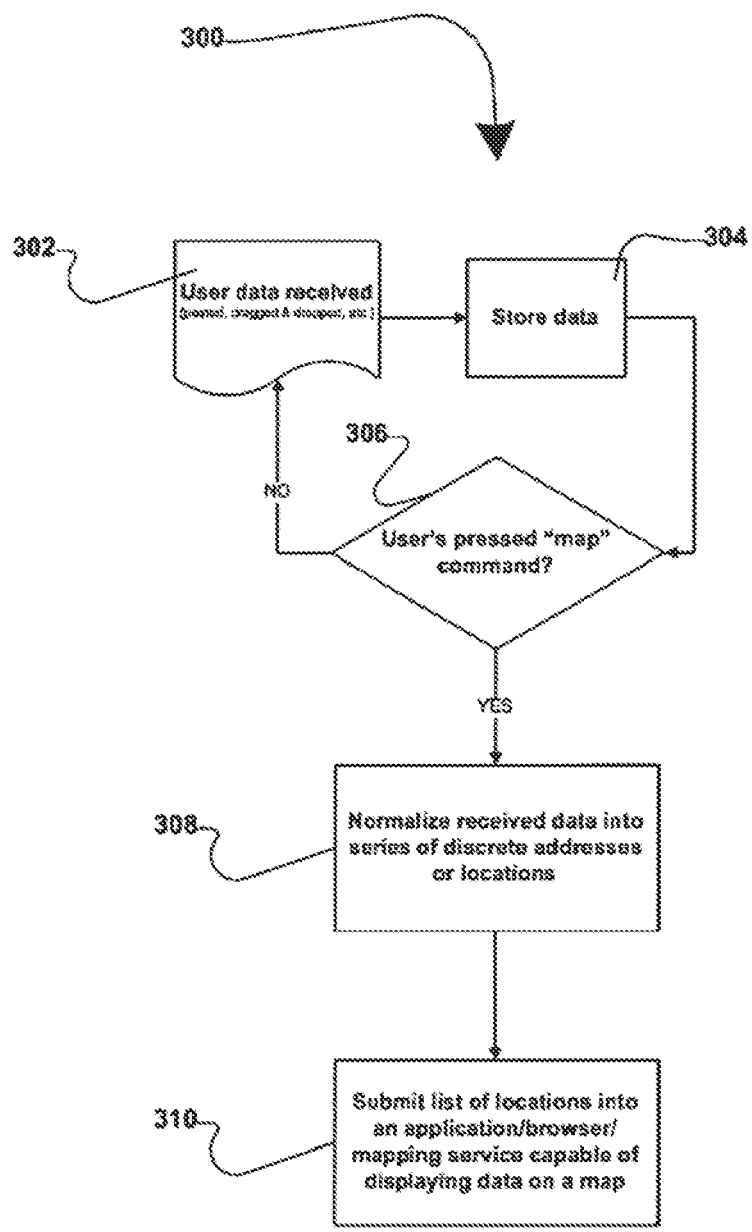
FIGS. 3A and 3B are generalized flow diagrams illustrating the operation of a software module receiving location information and relaying it to a mapping application, according to one embodiment of the present invention.
Figure 3B:
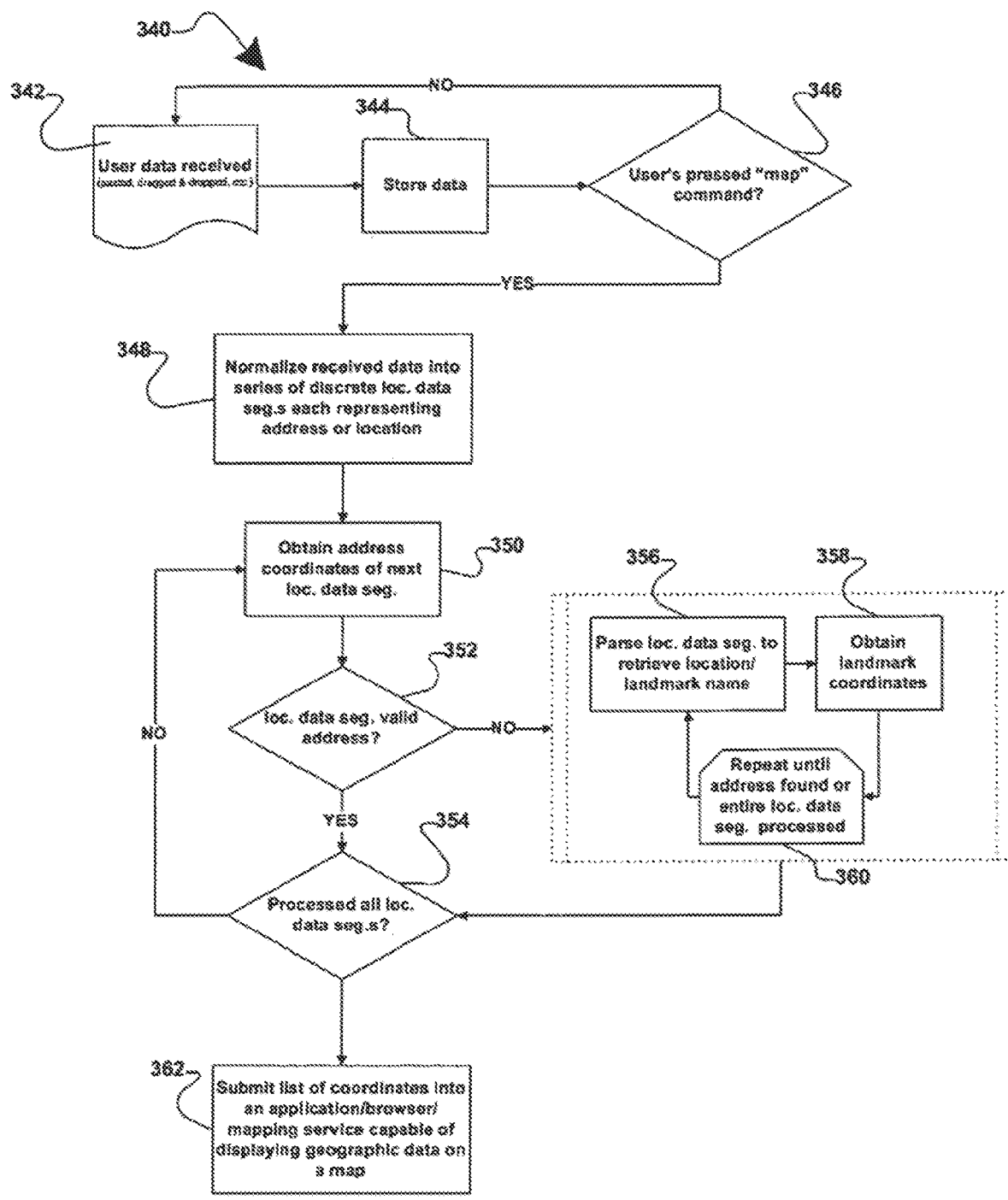

FIGS. 3A and 3B are generalized flow diagrams illustrating the operation of a software module receiving location information and relaying it to a mapping application, according to one embodiment of the present invention. Referring to FIG. 3A, process 300 may be utilized by a mapping component (e.g., a top-most application appearing on top of other applications, allowing the user to drag-and-drop location data to it; an ActiveX control; a widget, an application on a PDA, etc.) on a user's device. At step 302, the mapping component may receive data representing location information from a source external to the component (e.g., location information dragged-and-dropped from another application; location information in the computer's clipboard, pasted; location information typed by the user, location information selected from a list, etc.) At step 304, location information received may be stored. Steps 302 and 304 may be repeated until, at step 306, the user presses a command to map location information aggregated and stored at step 304. At step 308, aggregated location information stored at step 304, may be normalized. (I.e. aggregated location information stored at step 304 may be parsed into discrete location identifiers, such as street addresses, and extraneous data may be removed.) For example, location information received at step 302, and stored at step 304, may contain multiple locations and extraneous text, such as "2 for 1 special at 123 Folsom Street, San Francisco, Calif. for the best sushi in town|Star of India San Francisco." In this example, at step 308, the location data may be parsed into two discrete locations: "123 Folsom Street, San Francisco, Calif." and "Star of India San Francisco." At step 310, location data normalized at step 308 may be relayed to a mapping application. In the presently-preferred embodiment, the mapping application receiving normalized location information at step 310, may utilize mapping services and resources to obtain geographic coordinates for the location data, and display the multiple locations on a map.

Referring now to FIG. 3B, in an alternate embodiment 340, a mapping component may receive location information corresponding to multiple physical locations, derive physical coordinates of locations in location information, and relay derived coordinates to a mapping application for plotting locations on a map. At step 342 data containing location information ("location data") may be received by the mapping component. At step 344, the location data may be stored. Steps 342 and 344 may be repeated until the user issues a command, at step 346, to map the location data received and stored. At step 348, location data stored at step 344 may be normalized (i.e. broken into distinct location data segments where a location data segments may contain information denoting a single location.) At steps 350 through 360, location data segments may be analyzed to either derive the address/location reference in every location data segment; or, reject a location data segment that may not contain a valid address/location reference. At step 350, a location data segment stored in memory may be retrieved. If at step 352 it is determined that the location data segment represents a valid address, at step 354 step 350 may be repeated for the next location data segment until all location data segments have been examined. If at step 352 it is determined the location data segment is not a valid address, the retrieved location data segment may be parsed (e.g., extraneous characters may be removed, etc.) at step 356 to retrieve an address or landmark name or reference (e.g., name of place, street address, etc.). Additionally or alternatively, at step 352 an interpretation of the location data, or location data segment, may be performed. For example, an interpretation may include a "guess" at the intended location or address. At step 358, coordinates for the landmark name/address may be retrieved (for example, from an on-line mapping service, database, etc.) At step 360, if the coordinates of the address retrieved at step 358 are valid, the coordinates may be stored; if the address/coordinates are invalid, the location data segment may be discarded (e.g., the user may have drag-and-dropped the wrong text as an address or a location name that could not be parsed or resolved, etc.) At step 354, if there are location data segments remaining to be processed, step 350 may be called; otherwise, at step 362, coordinates of all addresses obtained at steps 350 through 360 may be relayed to an application for plotting (e.g., a desktop application, a web-based mapping application, a PDA-based application, etc.)

Figure 4A:
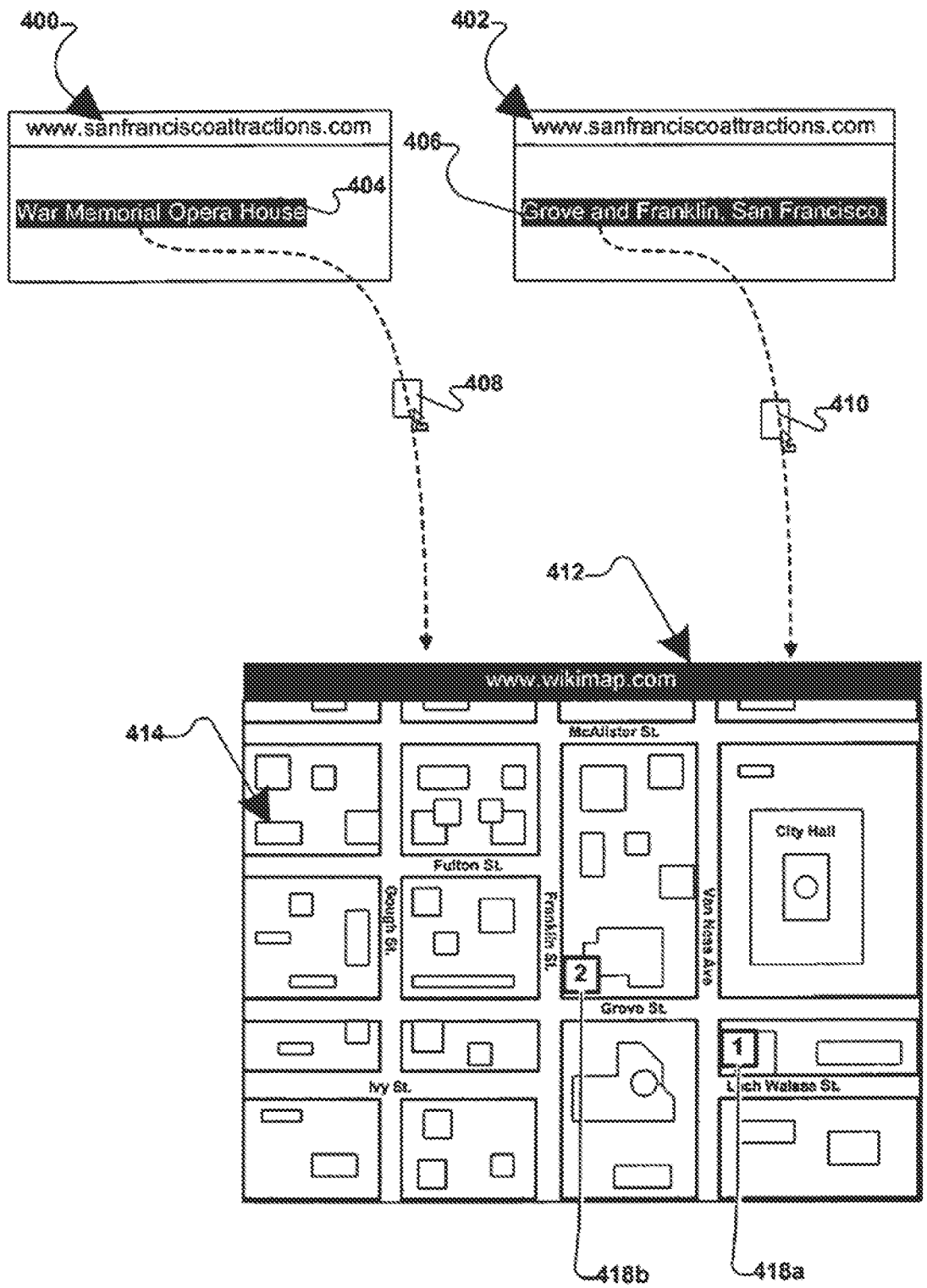
FIGS. 4A and 4B are generalized block diagrams illustrating the relaying of information in web browsers to a mapping component, according to one embodiment of the present invention.
Figure 4B:
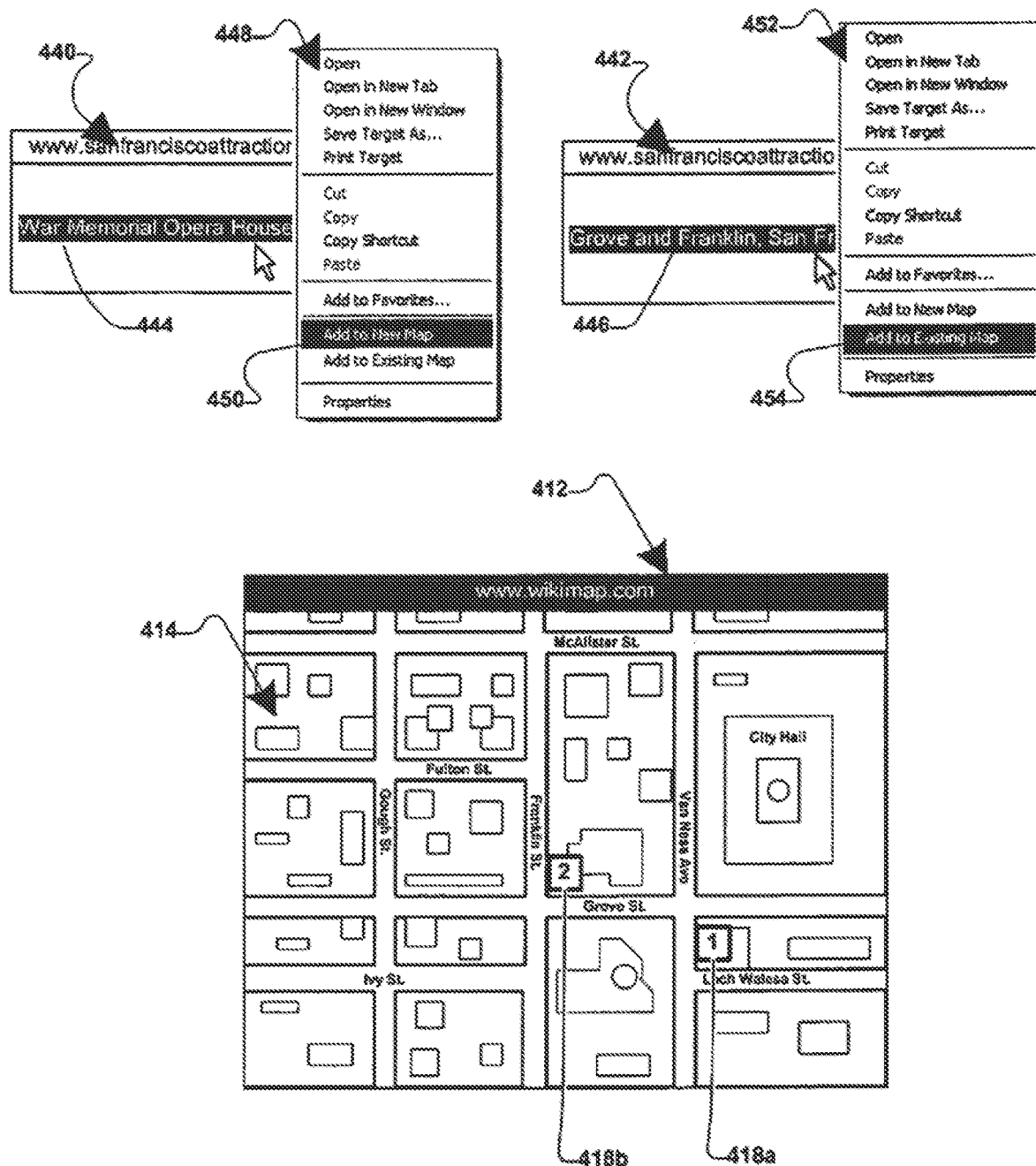

FIGS. 4A and 4B are generalized block diagrams illustrating the relaying of information in web browsers to a mapping component, according to one embodiment of the present invention. Referring to FIG. 4A, web browser applications ("browser(s)") 400 and 402 may contain location information 404 and 406, respectively. A display application 412 (e.g., web browser, standalone executable, applet, widget, etc.) may receive data from other applications ("source applications") 400 and 402 (e.g., via ActiveX, DDE, OLE, API, COM, DCOM, etc.) and plot location indicators 418a and 418b on a map 414 (e.g., street map, topographical map, mashed map showing various other data, etc.) The user may select data in a source application (e.g., highlight data "Grove and Franklin, San Francisco" 404 in browser 400) and drag-and-drop the data (shown as a common drag-and-drop mouse pointer graphic 408 in FIG. 4A) into display application 412. Display application 412 may display the location information 404 as a location indicator 418a on a map 414. The user may select data in a source application (e.g., highlight data "War Memorial Opera House" 406 in browser 402) and drag-and-drop the data (shown as a common drag-and-drop mouse pointer graphic 410 in FIG. 4A) into display application 412. Display application 412 may display the location information 406 as a location indicator 418b on a map 414. Display application 412 may perform a reference lookup on location information 406 (e.g., by performing a lookup against a location/address database on a mapping DVD, a Web Map Service, etc., correlating location information 406 with street address and/or geographic coordinates.)

In an alternate embodiment, context menus may be used to relay location information to a mapping application. Referring now to FIG. 4B, a context menu 448 (or shortcut menu, or any menus which pop up in response to a user's action, such as clicking an item in a graphical user interface, offering a list of options which vary depending on the context of the action, the application running, and the item selected.) Context menu 448 may include functionality common to a browser-based context menu, such as "Open", "Save Target As . . . ", "Add to Favorites . . . ", etc.) may be displayed in response to a user's right-clicking on a selected text 444 in a browser application 440. Context menu 448 may include a menu function 450 (e.g., labeled "Add to New Map") for adding the selected text 444 to a new map. A user's selection of function "Add to New Map" 450 in context menu 448 may cause display application 412 to display a new map 414, and plot a location indicator 418a corresponding to the location of the text selected 444 in browser 440. In an alternate embodiment, a user's selection of context menu 448 function "Add to New Map" 450 may spawn a new instance of display application 412, showing a new map 414 with location indicator 418a plotted.

A browser application 442 may contain text 446 (for example text describing a location or an address or a name of a place, etc.) which the user may select (for example, by using a pointing device or keyboard to highlight the text.) The user may bring up a context menu 452, associated with the browser application 442 (for example, by right-clicking the mouse or pressing a certain key combination on the keyboard, etc.) The user may select a function 454 (for example, labeled "Add to Existing Map") from the context menu 452. Function 454 "Add to Existing Map" may add the location described in text 446 to an existing map 414, in a display application 412, as a location indicator 418b. In the presently-preferred embodiment, operating system API may be used to identify an existing running display application 412 and information pertaining to selected location in text 446 may be relayed to existing display application 412 and plotted as location indicator 418b on map 414. In alternate embodiments, in cases of multiple display applications and/or one or more display applications(s) displaying one or more maps, other algorithms may be used to choose the specific map or maps, in the specific display application or applications, where the new location indicator 418b may be displayed. For example, the display application displayed on top of other applications may be selected to display new location indicator 418b; or, a display application displaying a map whose range of coordinates is closest to the coordinates of new location indicator 418b may be selected; or, the last map of the last display application used may be selected for displaying new location indicator 418b, etc.

FIGS. 5A-5D are generalized block diagrams illustrating mapping functionality within a tabbed browser, according to one embodiment of the present invention. Tabs are navigational widgets in a web browsing application ("browser") where they are used to switch between different webpages without having to switch top-level windows. The example in FIGS. 5A-5D illustrates the maps that may be generated by a user who is planning a trip to New York City, and may be using multiple, disparate web sites to plot points of interest in New York City onto a single map showing a consolidated view of all points of interest selected in the various web sites.

Figure 5A:
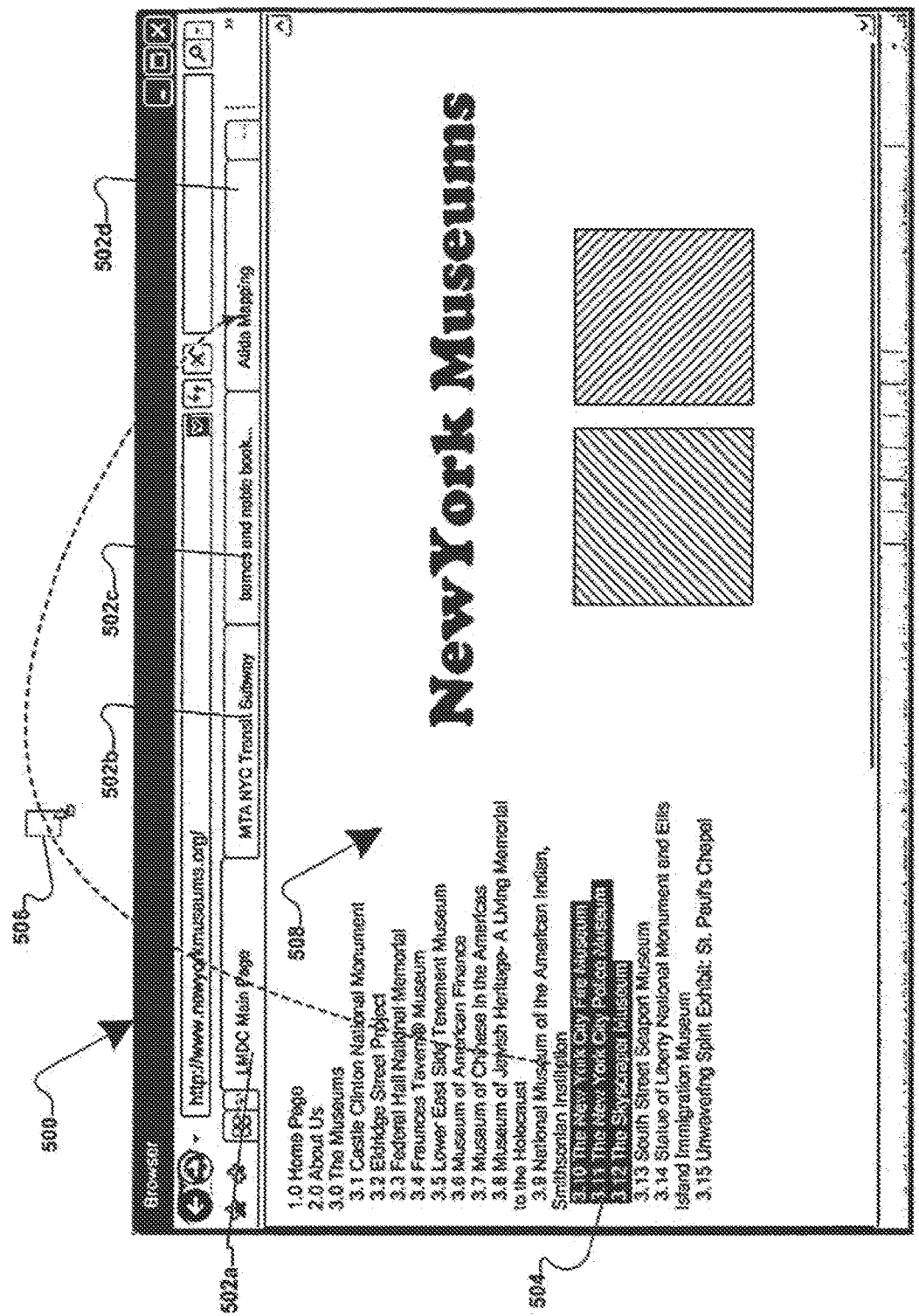
FIGS. 5A, 5B, 5C, and 5D are generalized block diagrams illustrating mapping functionality within a tabbed browser, according to one embodiment of the present invention.

Referring now to FIG. 5A, a browser 500 may contain multiple tabs, for example tabs 502a, 502b, 502c and 502d. In this example, tab 502a may display the content 508 of a web page. Tab 502a may point to a webpage "LDMC Main Page" which may contain a listing of museums in New York City. The user may use a pointing device or the keyboard to select text describing various listings 504 (e.g., names of museums) and drag-and-drop the selected text 504 to tab 502d. In this example, the user has selected three museums from a listing of dozens of museums, and dragged the text selected (herein indicated by a drag-and-drop mouse pointer graphic 506 usually denoting a drag-and-drop operation in computers) to a tab 502d in browser 500. A mapping component, for example an ActiveX control (not shown) associated with tab 502d may receive the selected and drag-and-dropped text 504. In alternate embodiments, the user may select portions of text 504 (e.g., a single line—or hotel name—at the time) and drag-and-drop the selected portions to tab 502d.

Figure 5B:
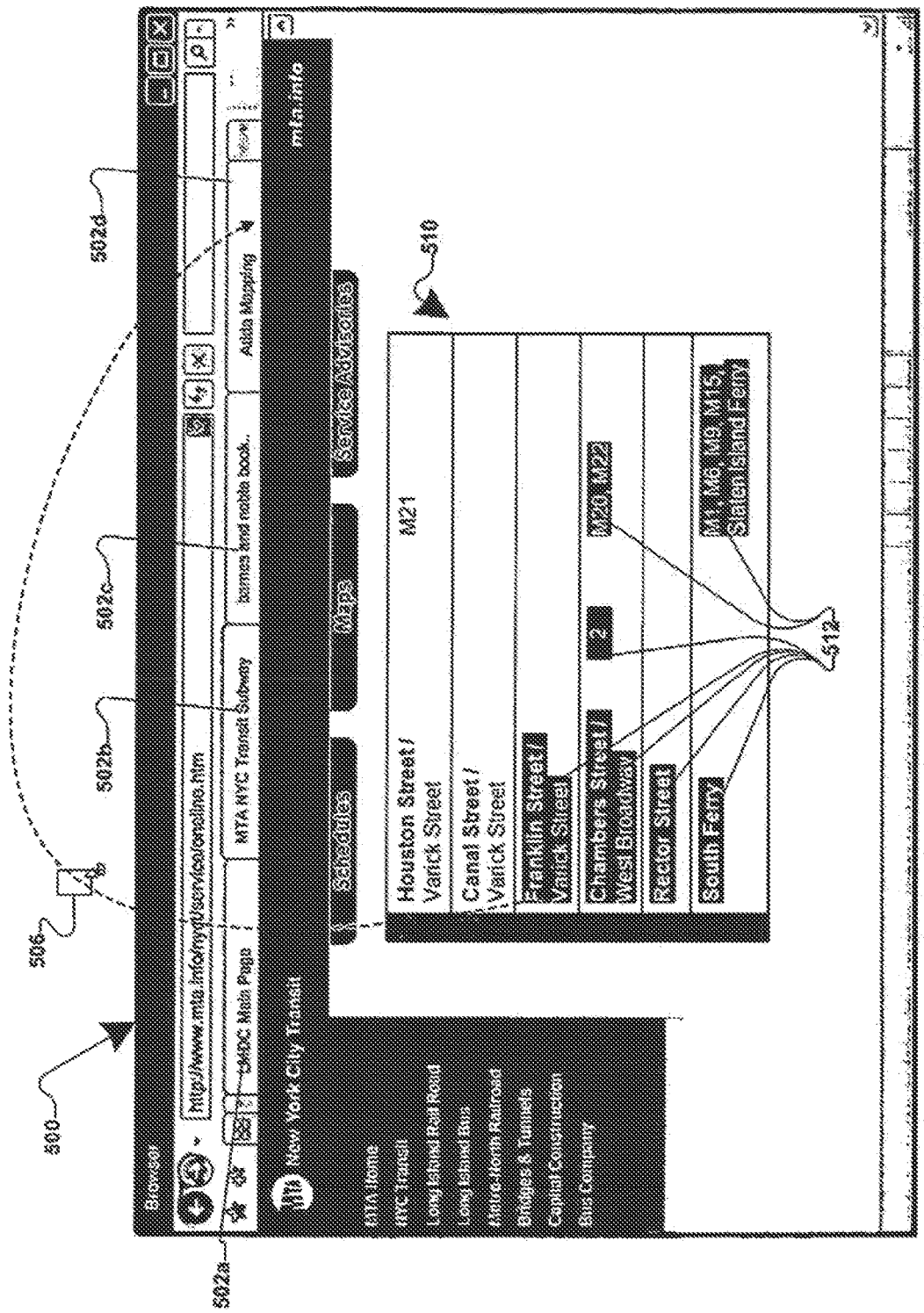

Referring now to FIG. 5B, the user may select tab 502b (in this example, labeled "MTA NYC Transit Subway" and displaying a web page 510 which may show a listing of New York subway stations.) The user may select text 512 off of web page 510 and drag-and-drop (denoted by mouse pointer graphic 506) the selected text 512 onto tab 502d to be processed by a mapping component (not shown) associated with tab 502d. Note that a text selection 512 on a web page 510 may capture superfluous data (in this example words like "2" "M20, M22", "M1" etc.) which may be removed, or suitably interpreted or ignored, by a mapping component (not shown) associated with tab 502d which may receive the text 512 for plotting on a map.

Figure 5C:
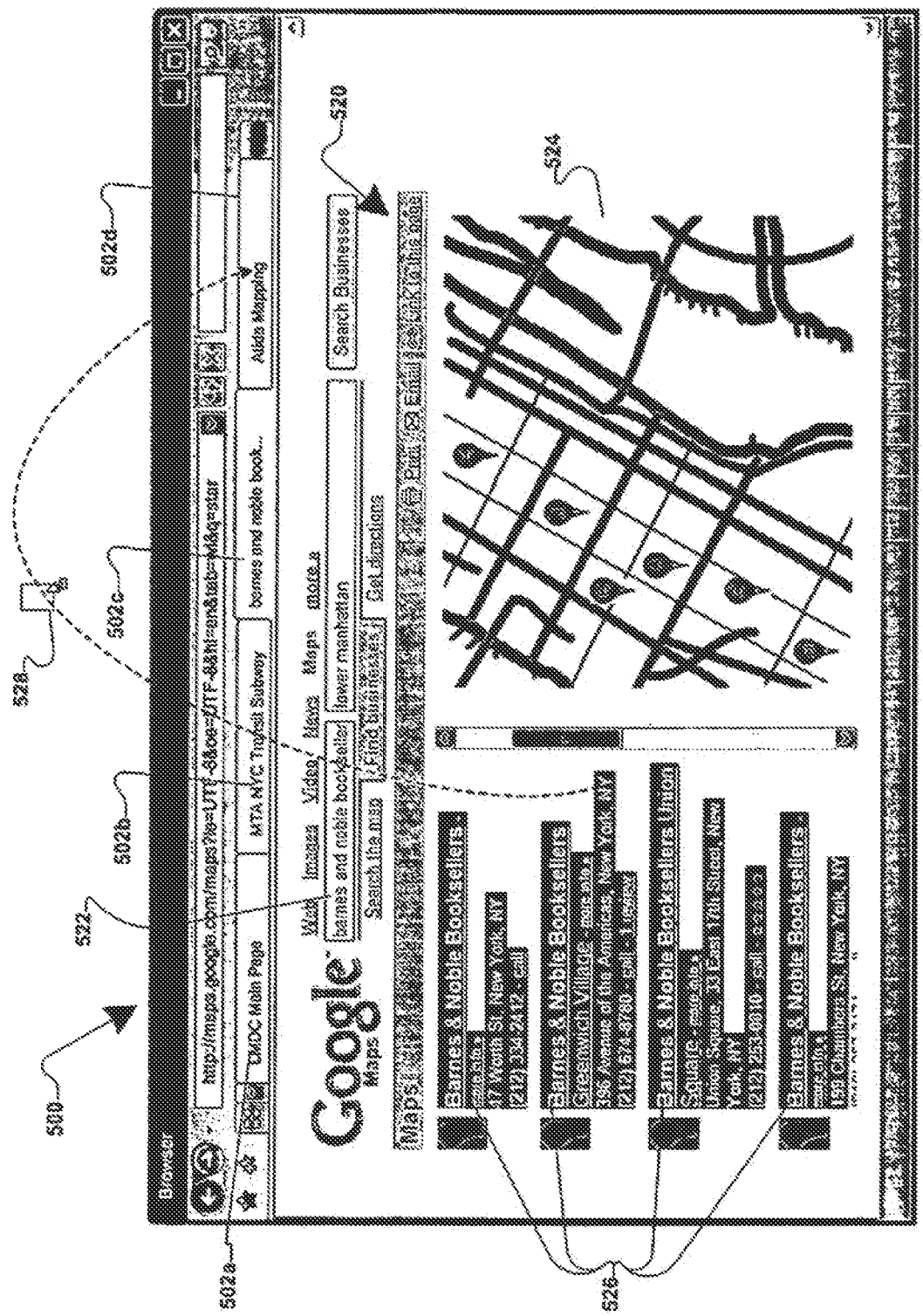

Referring now to FIG. 5C, the user may select tab 502c, and use an online mapping service 520 (in this example Google Maps®, but in other examples other online mapping services may be used) to search for, and plot on a map 524, the locations produced by a search query 522 (in this example "barnes and noble booksellers" which may display a list 526 of all Barnes and Noble bookstores in New York City.) The displayed list of locations 526 may be selected by the user and transferred (represented by drag-and-drop mouse pointer graphic 528) onto a tab 502d. A mapping component (not shown) associated with tab 502d may receive the selected data/list of locations 526.

Figure 5D:
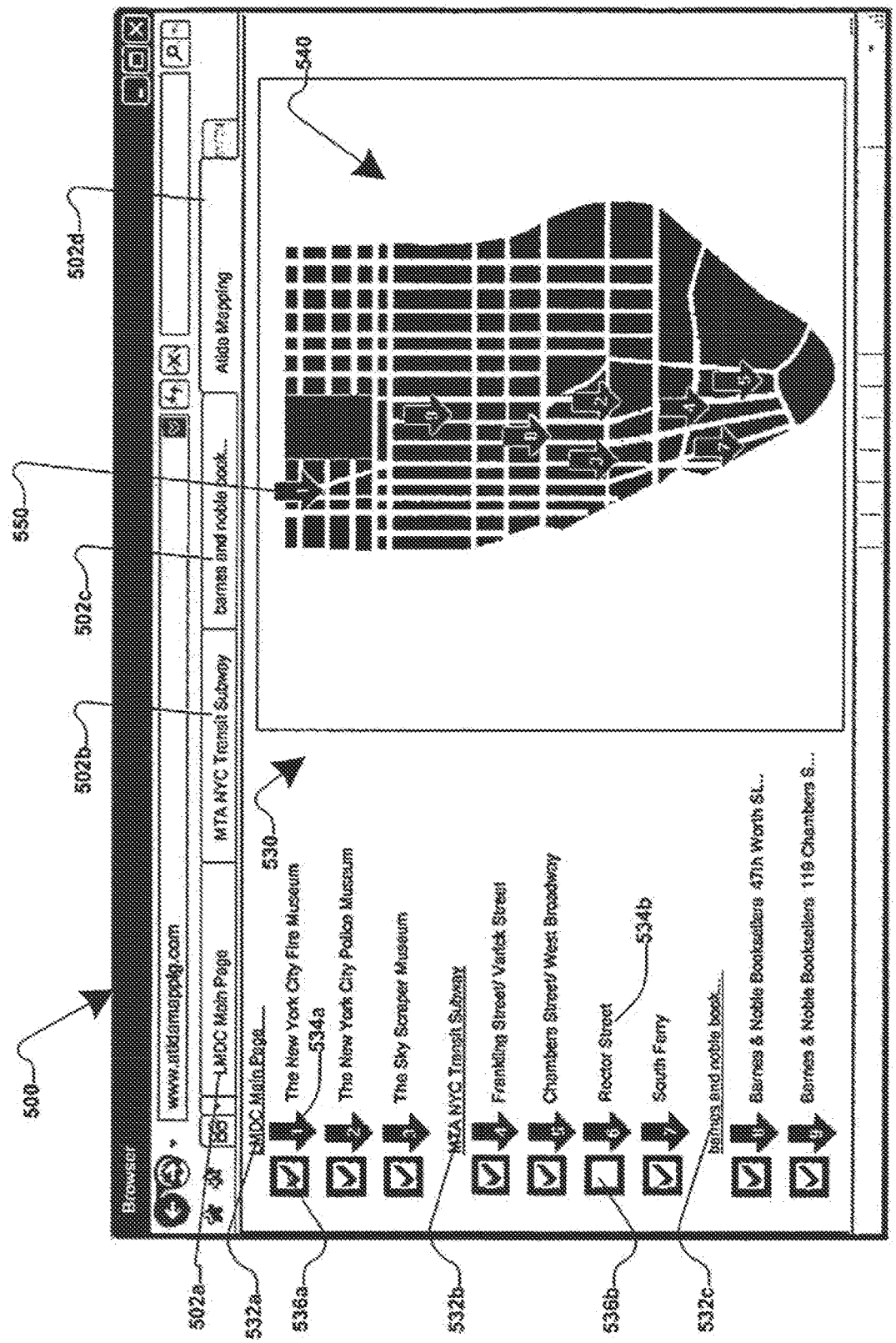

Referring now to FIG. 5D, the user may select tab 502d in browser 500 to display a web page 530. Web page 530 may contain a list of all locations selected in FIGS. 5A-5C (Refer to FIGS. 5A-5C for location lists 504, 512 and 526) and drag-and-dropped onto tab 502d and processed by a mapping component (not shown) associated with tab 502d. Web page 530 may display a map 540 showing points corresponding to the location list displayed in web page 530 (in this example points are denoted by thick, solid down-arrows with a location identifier—a number shown in this example—in the middle 550.) In the presently-preferred embodiment, titles 532a, 532b and 532c may correspond to the titles of the tabs 502a, 502b and 502c, respectively, from which lists of locations were dragged-and-dropped. A list of locations dragged-and-dropped from a web page corresponding to a tab, may be displayed in association with the title of the tab. In this example, title 532a "LMDC Main Page" may correspond to the title of tab 502a, from whose web page 508 location list 504 (refer to FIG. 5A) may have been dragged-and-dropped onto tab 502d, and thus onto web page 530. In alternate embodiments, other titles may be used.

In the presently-preferred embodiment, location selection controls such as location check-box controls 536a and 536b may be associated with location names 534a and 534b, respectively. The user may check a location check box control 536a, corresponding to location name 534a, which may cause a location indicator 550, associated with location name 534a, to display on the map 540. The user may un-check checkbox control 536b which may cause a location indicator corresponding to location 534b ("Rector Street" in this example) to not display on map 540 (or to de-emphasize location identifier). In alternate embodiments, locations listed, and their corresponding location indicators on the map, may be denoted by location indicators in various different colors, shapes, etc. In alternate embodiments different maps and map mash-ups may be displayed along with/on top of map 540 (e.g., traffic, driving directions among the plotted points, etc.)

Figure 6:
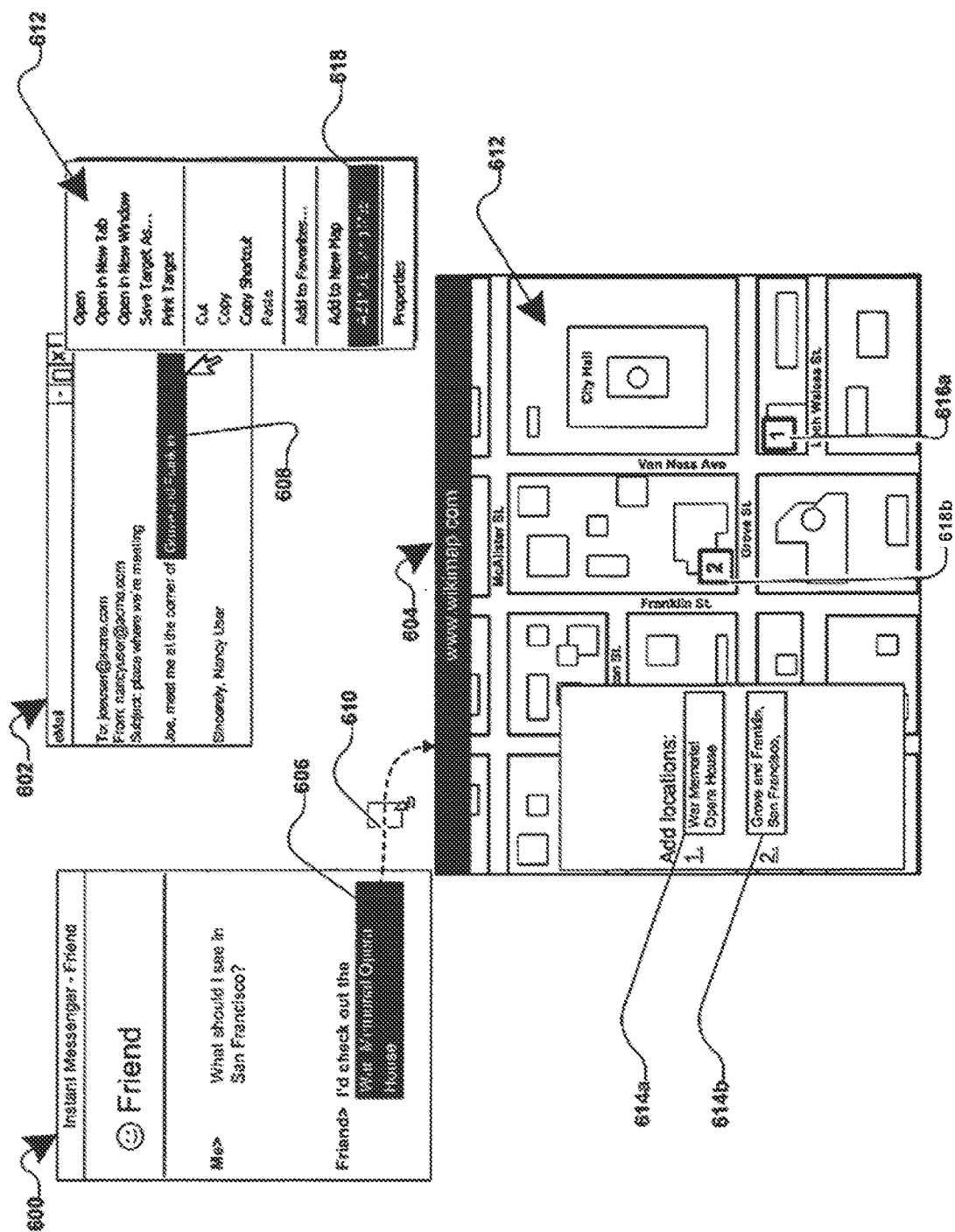
FIG. 6 is a generalized block diagram illustrating the mapping of geographic data in communication applications, according to one embodiment of the present invention.

FIG. 6 is a generalized block diagram illustrating the mapping of geographic data in computer applications, according to one embodiment of the present invention. The user may relay location data (e.g., names of places, street addresses, geographic coordinates, etc.) from various communication applications (e.g., email, instant messenger, online chat rooms, web browsers, document-processing applications, productivity applications, etc.) onto a common map, for plotting.

A mapping component may be a part of a map-display application, providing the map-display application with the functionality of receiving location information from other applications on the user's system. In one embodiment, the map-display application may be a web browser and the mapping component may be an ActiveX control in the web browser enabling the web browser to receive location information from external sources. In another embodiment, the mapping component may be code providing the map-display application with OLE/DDE (Object Linking and Embedding/Dynamic Data Exchange) functionality enabling the map-display application to receive location information from external sources.)

An instant messenger application ("IM") 600 may contain text referring to a location ("location text") (e.g., "War Memorial Opera House".) The user may select the location text 606 and relay it (e.g., via a drag-and-drop operation denoted in this example by a drag-and-drag graphic 610, or via copy-paste operation, etc.) to a display application 604 Display application 604 may display a map 612 which may include point 616a, corresponding to the address of location text 606. Display application 604 may display a legend for map 612, including location text 606 displayed as legend text 614a. In the presently-preferred embodiment, text legend 614a may include a location identifier, such as "1", which may correspond to the location indicator 616a on map 612. In alternate embodiments, symbols and colors may be used instead of, or in addition to, serial numbers to correlate legend text 614a with location indicator 616a.

In the presently-preferred embodiment, the user may use context menus to relay or transfer location data to a display application. Email application 602 may contain location text 608 (in this example, the text "Grove and Franklin".) The user may initiate a context menu 612 (typically by right-clicking the mouse or using a keyboard key combination.) Context menu 612 may include functionality 618 (in this example titled "Add to Existing Map".) Selecting functionality 618 from context menu 612 may cause a location indicator 618b to be plotted on a map 612 in mapping application 604. Location indicator 618b may correspond to the address of the location text 608 in eMail application 602. Legend text 614b, (which in this example may read "Grove and Franklin, San Francisco, Calif.") may correspond to location text 608 and location indicator 618b.

In alternate embodiments, a location-lookup may be performed by display application 604, deriving the address and/or coordinates of location text 606 and 608, prior to plotting location indicators 616a and 618b on map 612. The location-lookup may be performed against an online service, a local database, etc. For example, upon receiving location text 606 "War Memorial Opera House", display application 604 may perform a search of online databases and mapping services to derive the coordinates of a place called "War Memorial Opera House", and then plot the corresponding location indicator 616a on the map 612. In alternate embodiments, display application 604 may relay location text 606 to an online mapping service and receive and display map 612 with location 616a, plotted, from the mapping service. In another example, location text 608 "Grove and Franklin", relayed to display application 604, may be further relayed to an online mapping service which may return location text "Grove and Franklin, San Francisco" 614b, having correlated street names with city names. It should be noted that in the example above, the user may drag-and-drop location text 606 from IM 600 onto display application 604; and the user may use context menu 612 to relay location text 608 from email application 602 to display application 604. This specific example is shown for illustrative purposes only. Alternate embodiments may operate where the user uses context menus in conjunction with IM applications, and drag-and-drop operations in conjunction with email applications.

Figure 7A:
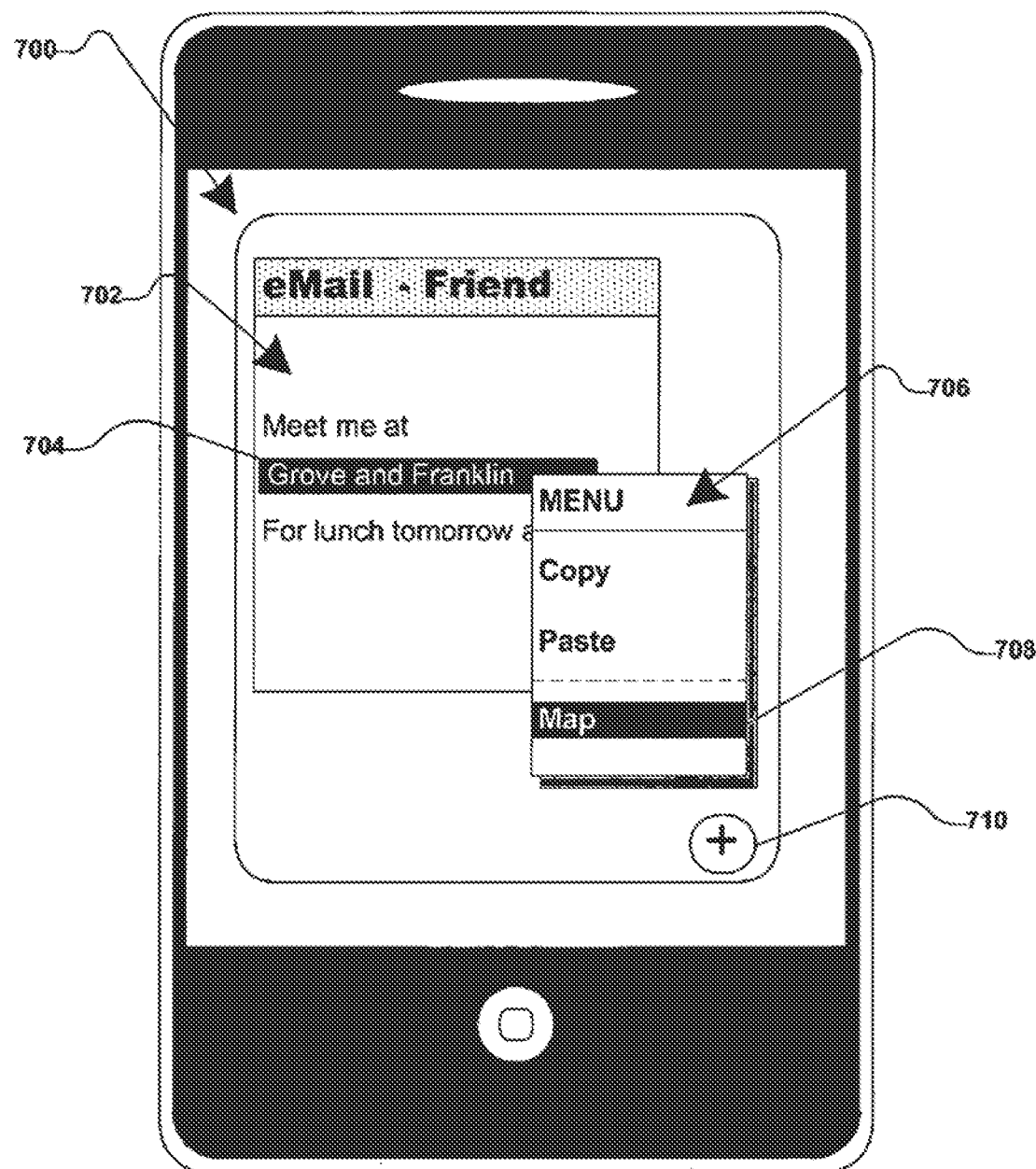
FIGS. 7A, 7B, and 7C are generalized block diagrams illustrating mapping functionality among various applications on a portable device, according to one embodiment of the present invention.
Figure 7B:
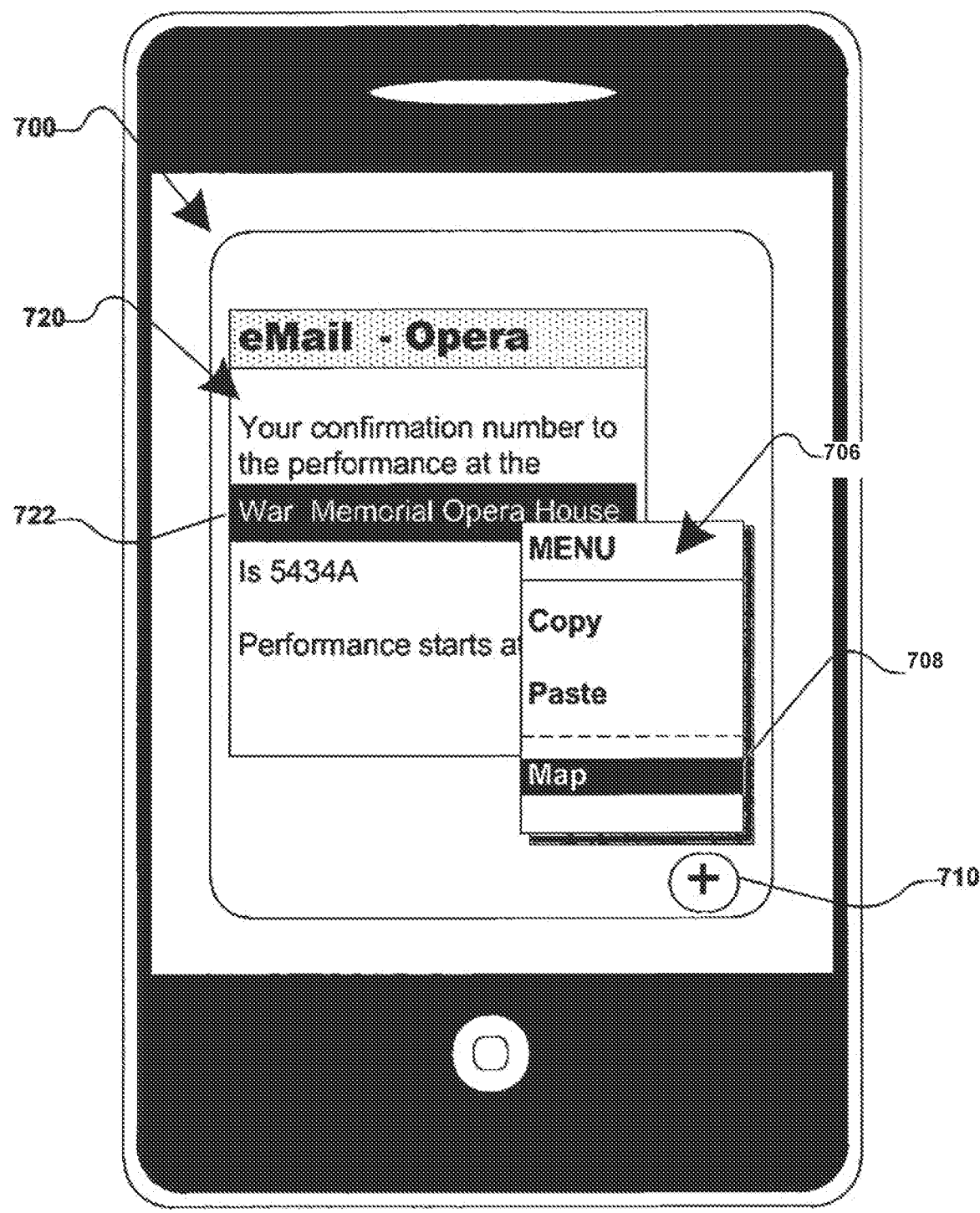
Figure 7C:
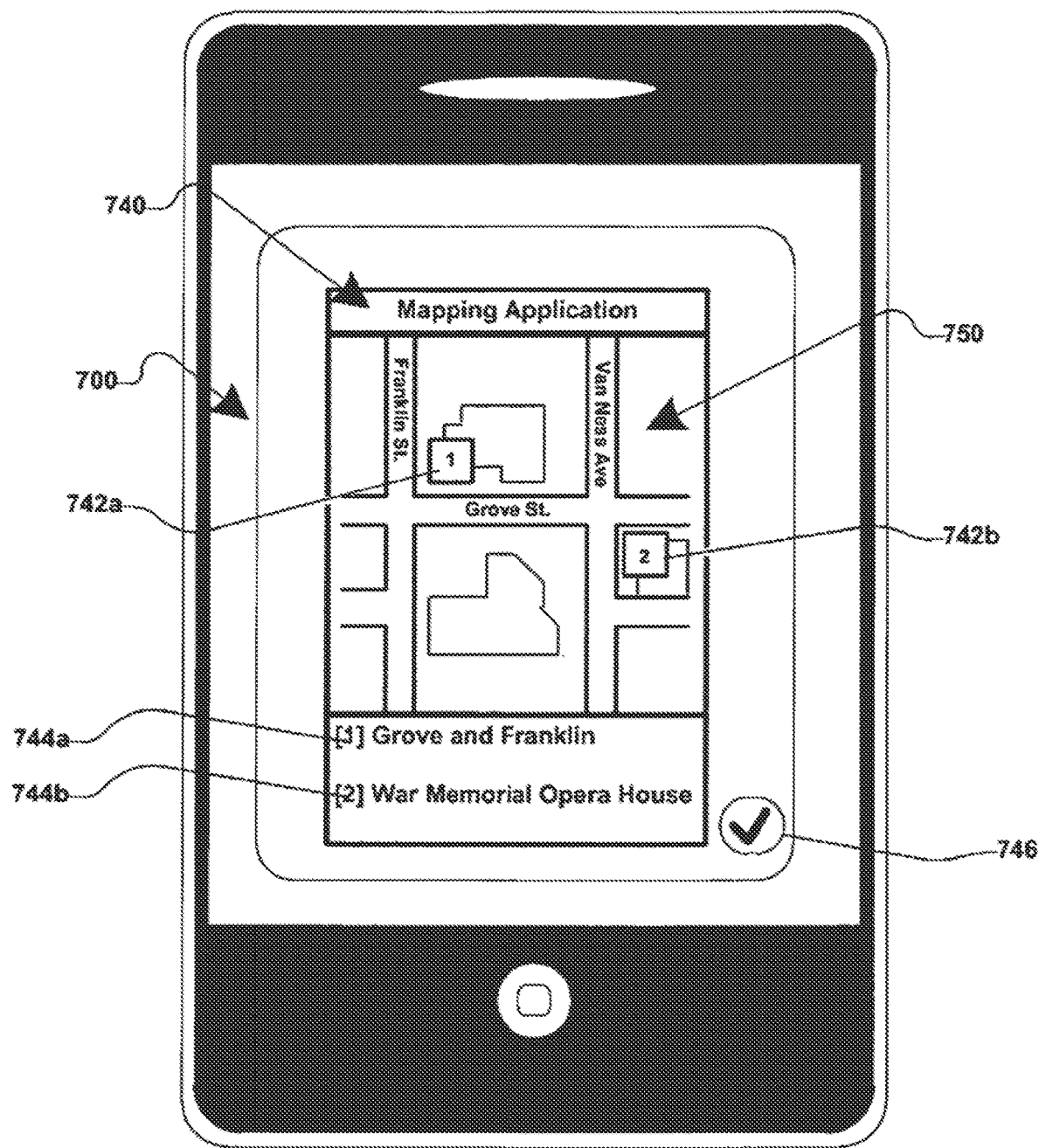

FIGS. 7A-7C are generalized block diagrams illustrating mapping functionality among various applications on a portable device, according to one embodiment of the present invention. Portable device 700 may be a Personal Digital Assistant ("PDA"), cellular phone, GPS tracking device, MP3 player or any other small electronic device that may be capable of displaying maps and sending/receiving data to/from mapping services.

Referring now to FIG. 7A, portable device 700 may display an email application 702. In this example, email application 702 may be an email from another user and may include location text "Grove and Franklin" 704. The user of portable device 700 may select location text 704 (using a pointing device such as a stylus, touch screen, the keyboard or any other means of selecting text.) In alternate embodiments, the operating system of portable device 700 may pre-select address-related location text 704 automatically as it is becoming an increasingly common practice for portable devices to automatically pre-select, or highlight or hyperlink, text displayed if the text matches certain criteria, such as famous names of people, locations etc. In the presently-preferred embodiment, the user may bring up a context menu 706 (for example, by using a pointing device such as a stylus, by pressing a key or a key combination, or in whatever other way that is supported by portable device 700.) The context menu 706 may include functionality 708 for mapping the selected location text 704. Mapping functionality 708 may add the selected location text 704 to the portable device's memory (for example, clipboard.) Selected location texts in the portable devices memory/clipboard may later be used to generate a map which may display, and other location text, as points or with location indicators.

In alternate embodiments, portable device 700 may include a designated control (for example button 710) ("location add button") for adding locations to a map with a single click. Pressing the designated location add button 710 may add selected location text 704 to memory as a location to be mapped, without the need to display a context menu and select mapping functionality from the menu. In alternate embodiments various key combinations may be designated to achieve the functionality of adding a selected location text to memory, as location to be mapped, with minimal clicks and without the use of a context menu.

Referring now to FIG. 7B, an email application 702 on portable device 700 may contain text referencing a location. In this example, the user may select location text "War Memorial Opera House" 722 from within the displayed contents of email 720. The user may bring up context menu 706 (for example, by using a pointing device such as a stylus, by pressing a key or a key combination, or in whatever other way that is supported by portable device 700.) Context menu 706 may include mapping functionality 708 for adding the selected location text 722 to a common map. In the presently-preferred embodiment, the selected location text 722 may be added to the portable device's 700 memory/clipboard for later mapping along with other location data added to the memory/clipboard at various other times. In an alternate embodiment, portable device 700 may include a control 710 designated for adding a selected location text 722 to a memory of locations to be mapped, with a single click. For example, control for adding location text to a mapping queue may be a button 710, or a designated collection of buttons (for example, pressing a pre-assigned keyboard key combination such as "Alt" and "M".)

Referring now to FIG. 7C, a map-display application 740 on portable device 700 may display a map 750. Map 750 may include one or more location indicators 742a and 742b, corresponding to location texts (e.g., location text 704 in FIG. 7A and location text 722 in FIG. 7B) that have been flagged by the user as to be mapped. A legend correlating location names "[1] Grove and Franklin" 744a and "[2] War Memorial Opera House" 744b with location indicator 742a and 742b, respectively, on map 750, may be displayed. The titles of locations names 744a and 744b may be similar to the location texts they represent (e.g., location text 704 in FIG. 7A and location text 722 in FIG. 7B.)

In alternate embodiments, a designated mapping control 746 (for example a button on the portable device 700) may cause map-display application 740 to launch and display a map containing all location texts added to memory in prior steps. In alternate embodiments, upon adding a first location text to a mapping queue (for example adding location text 704 in FIG. 7A), map-display application 740 may launch automatically, load the proper map based on the coordinates of the first location text 704 (for example, from an online mapping service) and plot the location indicator 742a on the map 750. Successive location texts added to a mapping queue (e.g., location text 722 in FIG. 7B) may be plotted automatically as location indicator 742b on map 750. In alternate embodiments, map-display application 740 may remain memory-resident (i.e. in a running state but not necessarily visible to the user) whereupon a new location text being flagged as to be mapped (for example via pressing mapping button 710 or context menu 706 in FIG. 7B) may trigger the map-display application 740 to display the new location indicator on the map 750.

While the above embodiments have the mapping program separate from the displaying program, in one alternate embodiment the mapping application may be a module of the map-display application. In yet another embodiment the map-display application may be a module of the mapping application. In yet another embodiment, the mapping application and map-display application may be integrated as a map generating and map-display application. The latter embodiments in which a map-display application and a mapping application are integrated, may be particularly applicable—but not exclusive—to portable devices, such as cell phones, PDAs, GPS devices, etc.

Figure 8A:
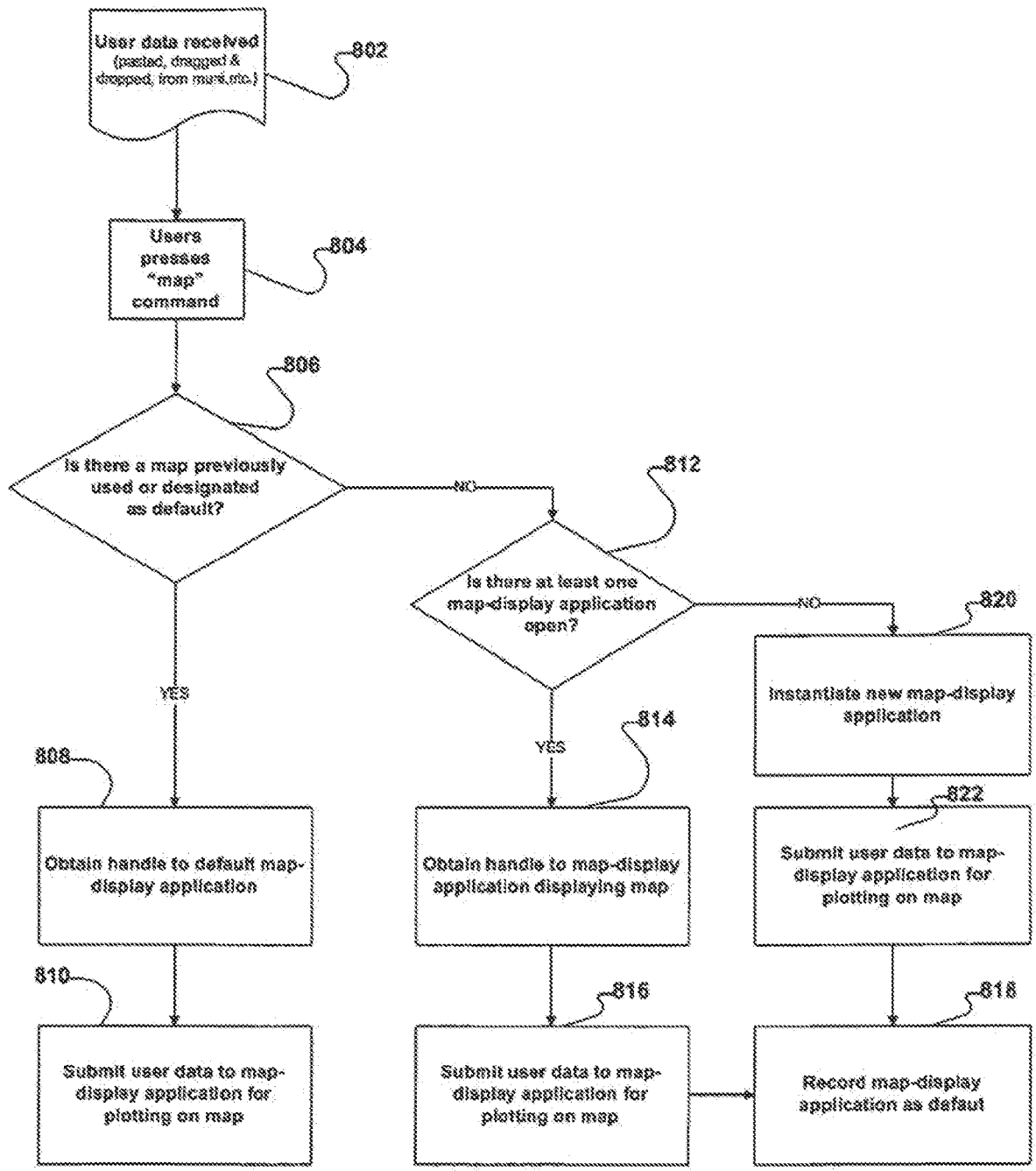
FIGS. 8A and 8B are generalized flow diagrams illustrating mapping functionality for selecting a map to receive user-selected mapping data ("mapping data"), according to two possible embodiments of the present invention.
Figure 8B:
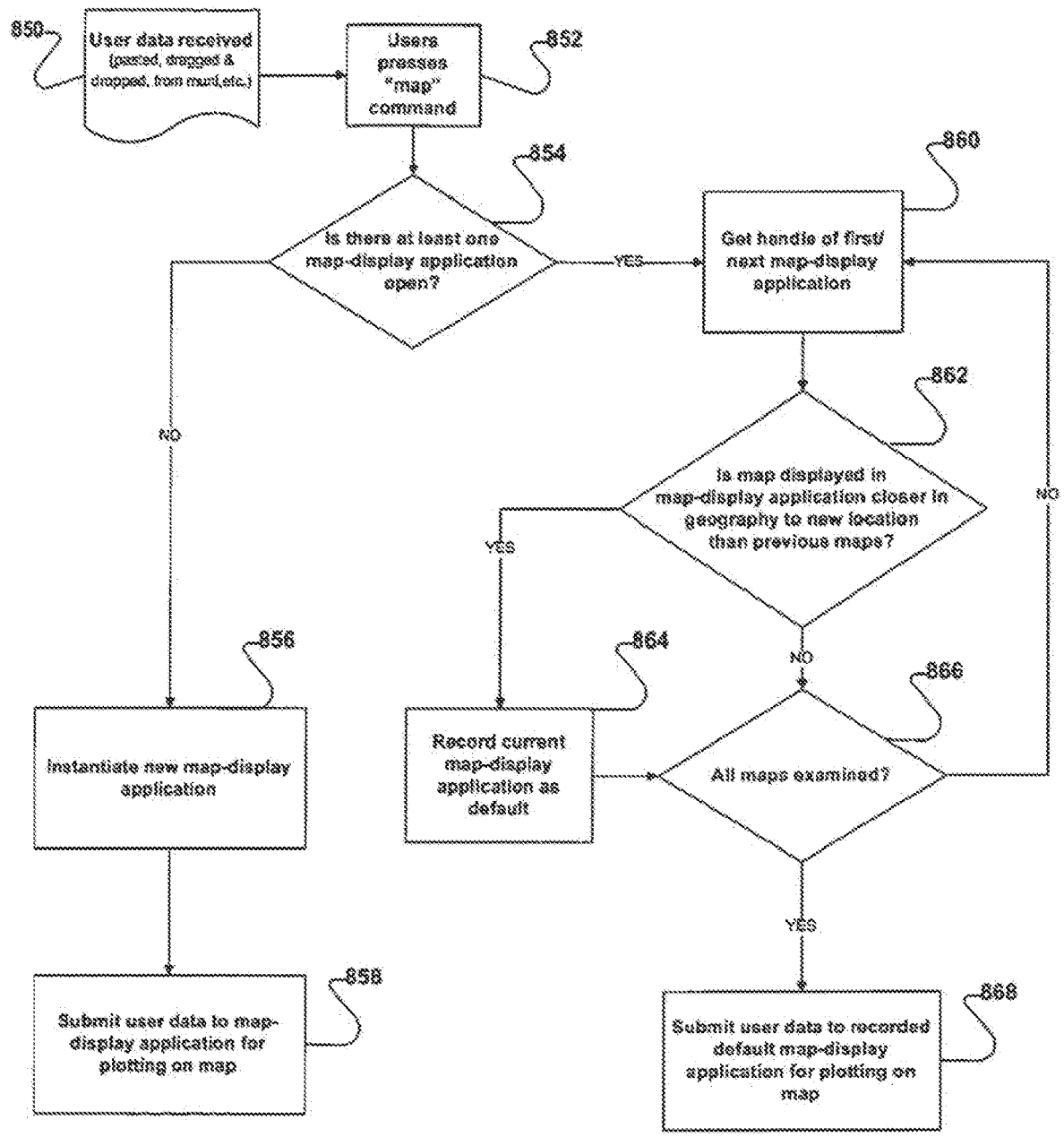

FIGS. 8A and 8B are generalized flow diagrams illustrating mapping functionality for selecting a map to receive user-selected mapping data ("mapping data"), according to two possible embodiments of the present invention. Referring to FIG. 8A, in one embodiment the system may submit mapping data to a map-display application that had been previously designated as the default map-display application to receive mapping data. At step 802, mapping data may be received by the map-display application. Mapping data may include location address, location description, place name, reference to a place, and any other information that may be plotted on a map. Mapping data may be received via a dragging-and-dropping, copying-and-pasting, typing, and any other means of receiving user input. At step 804, the user may use a control to execute the mapping of the mapping data. If at step 806 it is determined that there is a map-display application ("default map") that had previously been designated by the user to receive mapping data, at step 808 the handle for the default map may be obtained and at step 810 mapping data may be transmitted to the default map for display.

If at step 806 it is determined there is no default map, various algorithms may be used to select a map-display application and send to it the mapping data. In one embodiment, if at step 812 it is determined that there is at least one map-display application open (or accessible) ("available map-display application"), at step 814 the handle to the available map-display application may be obtained. In alternate embodiments various logic may be used to select a map-display application from amongst a plurality of available map-display applications (e.g., choosing the map-display application used last, or choosing the map-display application that displays a map most closely-related to the coordinates of the mapping data, or allowing the user to select a map-display application from a list of map-display applications, etc.) At step 816 mapping data may be submitted to the map-display application. At step 818 the map-display application selected at step 814 may be recorded and designated as default, such that it may be recognized in future iterations of step 806 as the default map.

If at step 812 it is determined no available map-display applications exist, at step 820 a new instance of a map-display application may be launched (e.g., the launched map-display application may be a map-display application designated by the operating system as the default applications for receiving maps, or the launched map-display application may be the last map-display application used, etc.) At step 822 mapping data may be transmitted to the map-display application. At step 818 the map-display application launched at step 820 may be recorded and designated as default, such that it may be recognized in future iterations of step 806 as the default map.

Referring now to FIG. 8B, an alternate embodiment for selecting the optimal map-display application to receive mapping data, is illustrated. At step 850 mapping data may be received. At step 852 the user may invoke a mapping command to map the received mapping data. If at step 854 it is determined that there is no available map-display application, at step 856 a map-display application may be launched. At step 858 the mapping data may be transmitted to the map-display application.

If at step 854 it is determined that one or more available map-display applications exist, an optimization algorithm ("optimization algorithm") at steps 860-866 may be run to automatically select the map-display application best suited to receive the mapping data.

With the first iteration of step 860, the handle of the first available map-display application may be obtained. In successive iterations of step 860, the handle of the next available map-display application ("current map-display application") may be obtained, until at step 866, it is determined there are no other available map-display applications. Map-display applications examined at steps 860-866 may be compared to one another to identify the map-display application whose displayed map is closest in geography to the location of the mapping data. If it is determined at step 862 that the current map-display application represents a closer geography to the location of the mapping data than previously selected/recorded map-display applications, at step 864 the current map-display application may be recorded as the new default map-display application; otherwise at step 866 the optimization algorithm may be repeated until all available map-display applications have been examined. At step 868 the mapping data received at step 850 may be submitted for display in a map-display application recorded at step 864 such that, given multiple available map-display applications, the user's location may be displayed on the map-display application whose map is most relevant to the new location the user has inputted.

In other embodiments various different optimization algorithms may be used to automatically add a new location inputted by the user, to a map most relevant to the user from amongst available maps on the user's system.

Figure 9A:
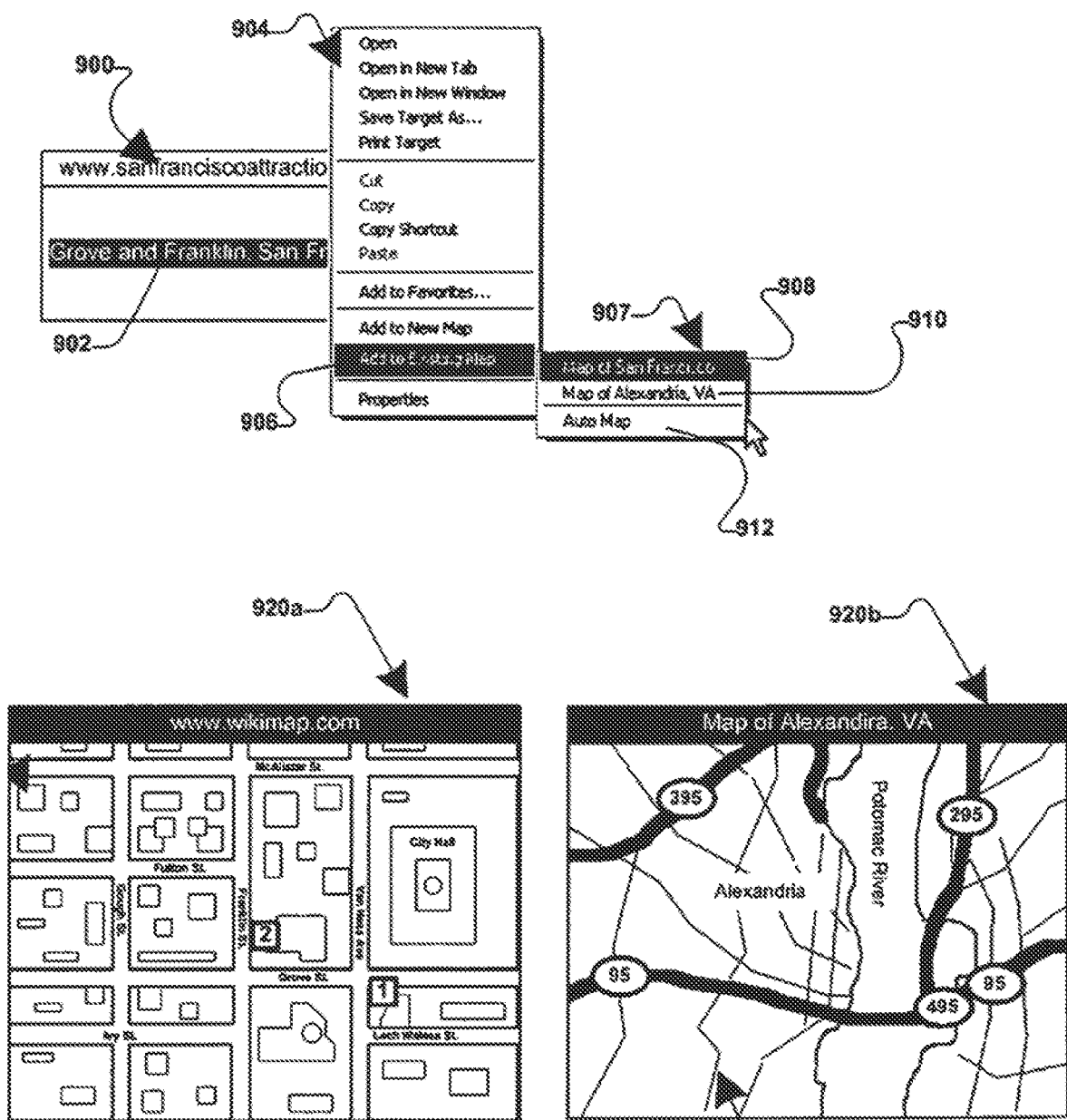
FIGS. 9A and 9B are generalized block diagrams illustrating mapping functionality for selecting a map to receive user-selected mapping data ("mapping data"), according to two possible embodiments of the present invention.
Figure 9B:
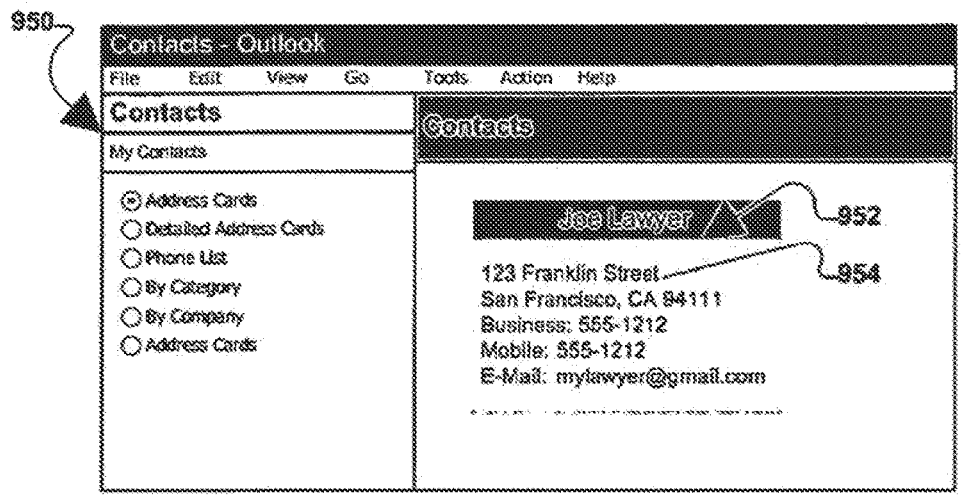
Figure 9B:
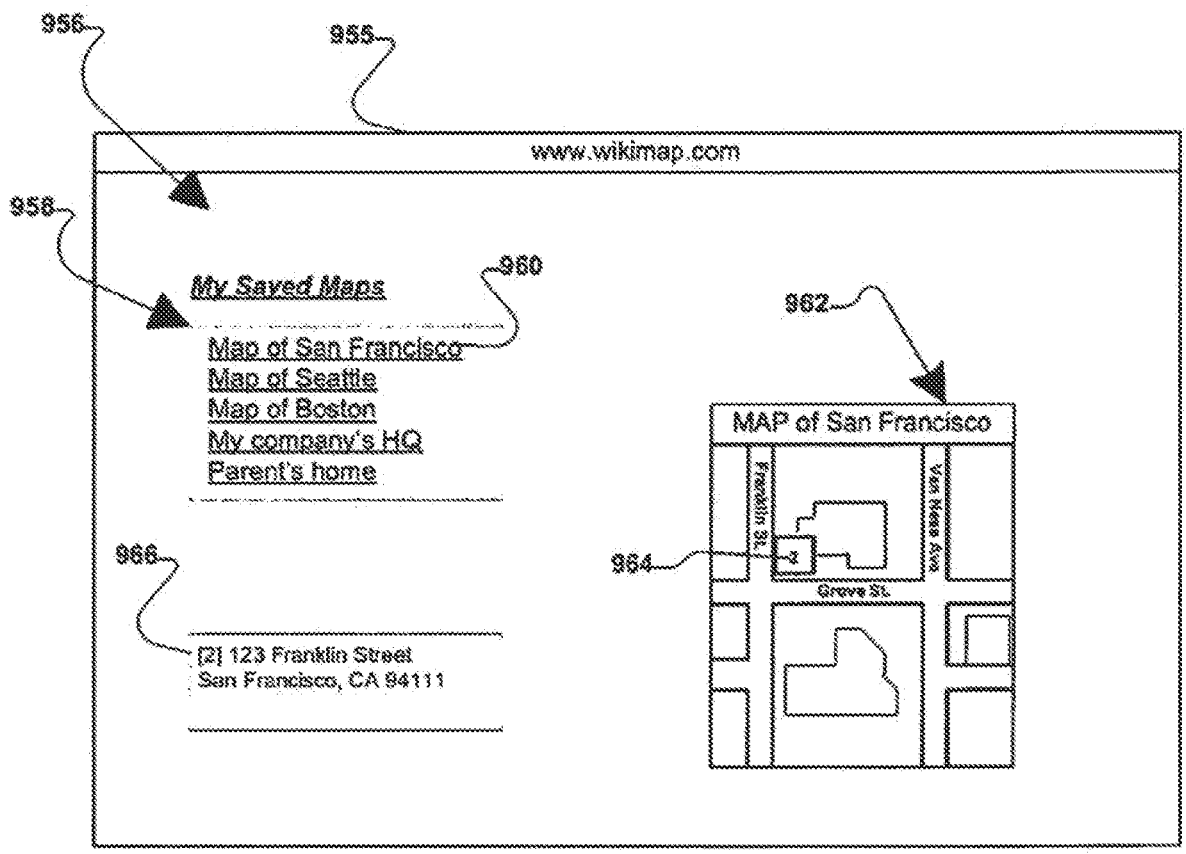

FIGS. 9A and 9B are generalized block diagrams illustrating mapping functionality for selecting a map to receive user-selected mapping data ("mapping data"), according to two possible embodiments of the present invention. Referring to FIG. 9A, an application 900 on the user's device may contain mapping data 902. A context menu 904 may display in response to a user action (for example, highlighting the text of the mapping data and right-clicking on the mouse, or a stylus, or a key combination designed to bring up a context menu, etc.) Context menu 904 may include a function 906 to add the mapping data to an existing, or predefined, map. (e.g., function 906 may be labeled "Add to Existing Map".) In response to selecting function 906, an additional context menu 907 may be displayed, allowing the user to select a map from a list of available maps 908 and 910 (e.g., "Map of San Francisco" 908 and "Map of Alexandria, Va." 910.) In the presently-preferred embodiment, the list of available maps 908 and 910, displayed in context menu 907, may be generated dynamically to reflect maps currently available 920a and 920b on the user's system. In this example, the user may select a map 908 "Map of San Francisco" from context menu 907, which may cause mapping data 902 to be sent for plotting onto map 920a, whose title "Map of San Francisco" is referenced in context menu 907 as function "Map of San Francisco" 908.

Context menu 907 may include a function allowing the system to automatically select the optimal map onto which to plot mapping data 902. Automatic-mapping function 912 (e.g., labeled "Auto Map") may execute an optimization algorithm that may recurse through maps 920a and 920b available to the user (e.g., maps in map-display applications displayed on the user's desktop, such as maps displayed in browsers, etc.) and select the optimal map for receiving and displaying the new mapping data.

In the presently-preferred embodiment, the map displaying the geography closest to the location in mapping data 902 may be selected. Various logic may be used to further optimize the map selection algorithm. For example, in one embodiment a map that can display the location in mapping data 902 with the least amount of zooming or panning from its original state, may be selected over other maps (e.g., between two available maps, one of downtown San Francisco and one of Silicon Valley, if mapping data 902 contains an address somewhere within San Francisco, the former map may be chosen because it can show mapping data 902 with the least amount of panning).

In an alternate embodiment the map that had been used last to receive input of mapping data may be selected automatically to receive the current mapping data 902. For example, if the user is planning a trip to a city, the user may successively select mapping data from various sources for display on a common map, even if some of the locations in the mapping data may be closer to the geography displayed in a different map.

In an alternate embodiment the user may designate various rules and criteria for the automatic selection of a map to receive mapping data. For example, the user may designate a certain location, such as their hotel while on a business trip, as a point of reference that must be included in the map selected to receive input of new mapping data. For example, if the user has designated a hotel in Manhattan as the point of reference and has chosen a location in Upstate New York as new mapping data, the map displaying the hotel in Manhattan may be automatically chosen to receive and display the new mapping data—though substantial panning may be required to show the new location—over another map that may include parts of Manhattan but does not include the specific hotel in this example.

In the presently-preferred embodiment, the map selected to receive the new mapping data may be automatically adjusted to accommodate—for example by zooming or panning—to include the new location in the mapping data.

Referring now to FIG. 9B, in another presently-preferred embodiment, a map-display application 955 may display a map portal 956 generated by a mapping application (collectively referred to herein as "mapping application" 956) (e.g., Yahoo! Maps®, Google Maps®, MapQuest®, Microsoft® Live Search Maps®, etc.) A mapping application may receive mapping data from the user and may automatically select the optimal map for displaying the mapping data, from a list of stored user maps. A mapping application 956 may display a saved list of user maps 958. As matter of common practice, the user may be required to log into the mapping application to identify them selves uniquely and gain access to their saved list of maps.

A desktop application 950 may contain mapping data 954. In one embodiment, desktop application 950 may be an email/contact-management application, such as Microsoft Outlook® or Lotus Notes®. Upon transmittal of mapping data to mapping application (for example via a user action such as drag-and-drop, copy-and-paste, context menu selection 960, etc. through a mapping component associated with the mapping application) the mapping application may select a map 962 on which to display the mapping data, automatically. The mapping application 956 may use various algorithms to select the optimal map on which to display the mapping data. For example, the map selected may be the map whose area of coverage includes the location in the new mapping data 964, or the map that requires the least amount of display change to include the new mapping data, or a map designated by the user as default for receiving mapping data, etc.

In an alternate embodiment, desktop application 950 may contain mapping data 954 as part of contact information 952 in a file format standard for personal data interchange, such as in the format of an electronic business cards (vCards). Prior to transmitting mapping data 954 to mapping application 956, mapping data 954 may be processed through a filter to isolate the relevant location information 966 (in this example, "123 Franklin Street, San Francisco, Calif. 94111") and submit only the relevant mapping information to the mapping application. In an alternate embodiment the mapping application 956 may recognize mapping data 954 as being in a known vCard format and may process the mapping data accordingly.

In alternate embodiments application 950 may be any application capable of displaying data that may be mapped, with no restriction as to the application type.

Figure 10A:
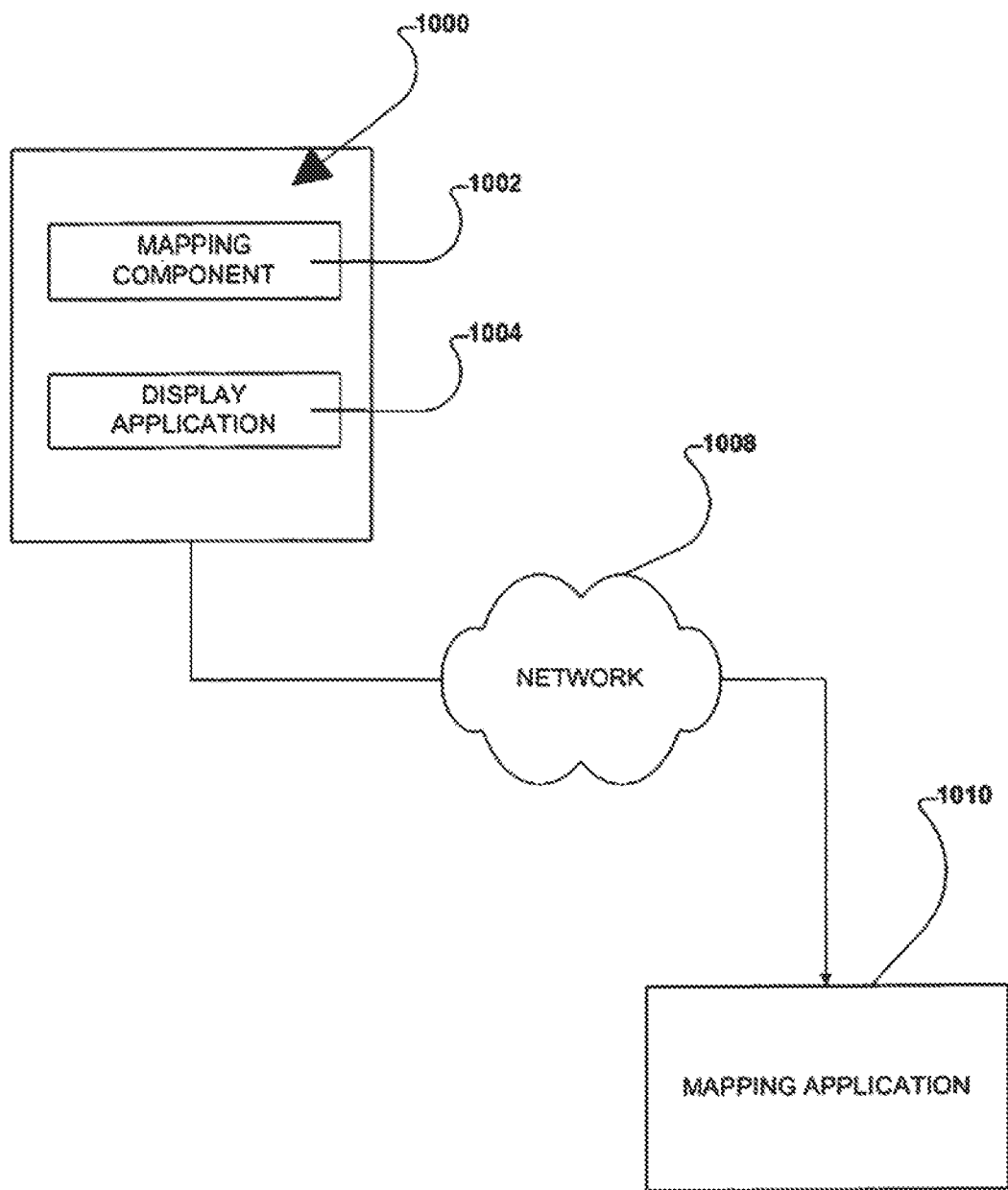
FIGS. 10A and 10B are generalized block diagrams illustrating the interaction of various components in a system for presenting address and mapping information, according to two embodiments.
Figure 10B:
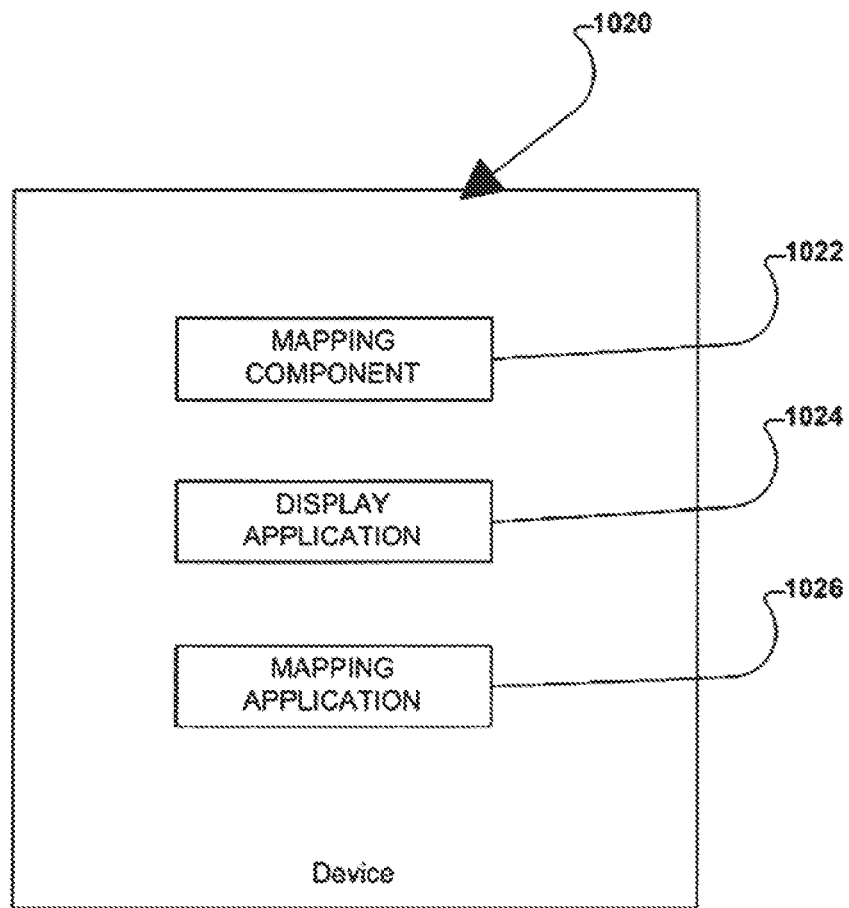

FIGS. 10A and 10B are generalized block diagrams illustrating the interaction of various components in a system for presenting address and mapping information, according to two embodiments. Referring to FIG. 10A, 1000 is a computing device (e.g., personal computer, workstation, thin client, PDA, cellular phone, GPS device, etc.)

Computing device 1000 may include a mapping component 1002 (e.g., a standalone application, a web-browser plug-in, an ActiveX control, a DLL, a COM object, a web object, a part of an application displaying and/or generating maps, etc.)

Computing device 1000 may include a display application 1004 (e.g., a web browser, a web user agent, etc.) capable of displaying a map generated by a mapping application 1010 (e.g., a mapping service such as Google Maps®, Yahoo! Maps®, Windows Live Search Maps®, MapQuest®, etc.)

Display application 1004 may communicate with mapping application 1010 over network 1008. (e.g., the internet, intranet, etc.)

Mapping component 1002 may receive user input containing address/location information. User input may include address/location information dragged-and-dropped into mapping component 1002. User input may include address/location information received by mapping component 1002 when a user selects a mapping command by invoking a control or by making a menu selection. Mapping component 1002 may relay/transmit the received address/location information to display application 1004. Display application 1004 may transmit address/location information (and any additional information required for mapping) to mapping application 1010 over network 1008. Mapping application 1010 may transmit to display application 1004 a map displaying the address/location information. Display application 1004 may display the map to the user of computing device 1000.

In an alternate embodiment, mapping component 1002 may be a module of display application 1004. In yet another embodiment, display application 1004 may be a module of mapping component 1002.

Referring now to FIG. 10B, in another embodiment, mapping component 1022, display application 1024 and mapping application 1026 may all reside on an electronic device 1020 (e.g., device 1020 may be a GPS unit or PDA able to generate maps with no access to a network or other devices/servers.) In yet another embodiment, mapping component 1022, display application 1024 and mapping application 1026 may all be a single application; or, modules of one another.

The examples above demonstrate the power and flexibility of the present invention in providing and presenting mapping disparate location information.

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A system for displaying location-based content on a digital map displayed on a mobile device, comprising:
- a memory of a mobile device storing a first non-browser application and a second non-browser application;
- a processor of the mobile device executing the first non-browser application;
- a touch screen of the mobile device displaying a first user interface of the first non-browser application, wherein the first user interface displays a first map, an icon corresponding to a location on the first map and a text associated with the icon;
- a GPS device of the mobile device determining a location of the mobile device; and
- a mapping component of the first non-browser application configured to communicate with an online mapping service,
- wherein upon receiving a touch of the touch screen corresponding to the text, the mapping component transmits a query including the location of the mobile device and the location of the icon to the online mapping service, and wherein, in response to the query, the touch screen displays in a second user interface of the second non-browser application a second map of the location of the mobile device, the location of the icon and a route between the location of the mobile device and the location of the icon.

2. The system according to claim 1, wherein the mapping component communicates with the online mapping service via an application programming interface.

3. The system according to claim 1, wherein the first map occupies less than the first user interface.

4. The system according to claim 1, wherein the query includes a zoom level for the second map.

5. The system according to claim 1, wherein the text is a street address corresponding to the location of the icon on the first map.

6. The system according to claim 1, wherein the text is a text hyperlink corresponding to the location of the icon on the first map.

7. A system for displaying location-based content on a digital map displayed on a mobile device, comprising:
- a memory of a mobile device storing a first non-browser application, a second non-browser application and a third non-browser application, wherein the second non-browser application and the third non-browser application are different map-display applications;
- a processor of the mobile device executing the first non-browser application;
- a touch screen of the mobile device displaying a first user interface of the first non-browser application, wherein the first user interface displays a first map, an icon corresponding to a location on the first map and a text associated with the icon;
- a GPS device of the mobile device determining a location of the mobile device; and
- a mapping component of the first non-browser application, and
- wherein upon receiving a touch of the touch screen corresponding to the text, the touch screen displays a prompt for a user to select one of the second non-browser application and the third non-browser application, and
- wherein the mapping component transmits a query including the location of the icon to an online mapping service associated with the selected one of the second non-browser application and the third non-browser application.

8. The system according to claim 7, wherein the query includes the location of the mobile device.

9. The system according to claim 8, wherein, in response to the query, the touch screen displays the location of the mobile device, the location of the icon and a route between the location of the mobile device and the location of the icon on a second map in a second user interface of the second non-browser application.

* * * * *